US005698120A

United States Patent [19]

Kurosawa et al.

[11] Patent Number: 5,698,120
[45] Date of Patent: Dec. 16, 1997

[54] LASER MACHINING SYSTEM WITH CONTROL BASED ON MACHINING STATE RECOGNITION

[75] Inventors: Miki Kurosawa; Yutaka Motoki, both of Aichi, Japan

[73] Assignee: Mitsubishi Denki Kabushiki Kaisha, Tokyo, Japan

[21] Appl. No.: 587,507

[22] Filed: Jan. 17, 1996

[30] Foreign Application Priority Data

Jan. 17, 1995 [JP] Japan .................. HEI-7-004964

[51] Int. Cl.$^6$ ........................... B23K 26/02
[52] U.S. Cl. ............... 219/121.62; 219/121.74; 219/121.83
[58] Field of Search .................. 219/121.61, 121.62, 219/121.74, 121.79, 121.76, 121.83; 364/474.08; 359/839, 359

[56] References Cited

U.S. PATENT DOCUMENTS

| | | | |
|---|---|---|---|
| 4,700,045 | 10/1987 | Merry et al. | 219/121.83 |
| 4,746,202 | 5/1988 | Perilloux et al. | 219/121.74 |
| 4,769,523 | 9/1988 | Tanimoto et al. | 219/121.62 |
| 4,825,035 | 4/1989 | Moriyasu et al. | 219/121.61 |
| 5,041,714 | 8/1991 | Funk | 219/121.62 |
| 5,155,328 | 10/1992 | Ikawa | 219/121.83 |
| 5,500,502 | 3/1996 | Horita et al. | 219/121.83 |
| 5,539,180 | 7/1996 | Mori et al. | 219/121.63 |

FOREIGN PATENT DOCUMENTS

| | | | |
|---|---|---|---|
| 63-144889 | 9/1988 | Japan | 219/121.83 |
| 63-317270 | 12/1988 | Japan . | |
| 64-83390 | 3/1989 | Japan . | |
| 1-170591 | 7/1989 | Japan . | |
| 1-215486 | 8/1989 | Japan . | |
| 2-165886 | 6/1990 | Japan | 219/121.83 |
| 2-205286 | 8/1990 | Japan | 219/121.83 |

*Primary Examiner*—Teresa J. Walberg
*Assistant Examiner*—Gregory L. Mills
*Attorney, Agent, or Firm*—Sughrue, Mion, Zinn, MacPeak & Seas, PLLC

[57] ABSTRACT

A laser machining system having a mirror for transmitting or reflecting laser light providing a sufficient light amount and light generated at a laser radiation point without degrading the laser light quality. A phase difference control mirror, which has a dielectric multilayer film as an optical film which allows light of a wavelength other than laser light to pass therethrough and which reflects the laser light almost 100% while the phase difference between S and P polarization components of the laser light before the laser light is reflected is substantially maintained, is provided in place of an optical path mirror located in an optical transmission line, whereby light of a wavelength other than that of the laser light can be extracted from the light generated at a laser radiation point on a workpiece during laser machining, and the extracted light is detected by an optical sensor.

13 Claims, 19 Drawing Sheets

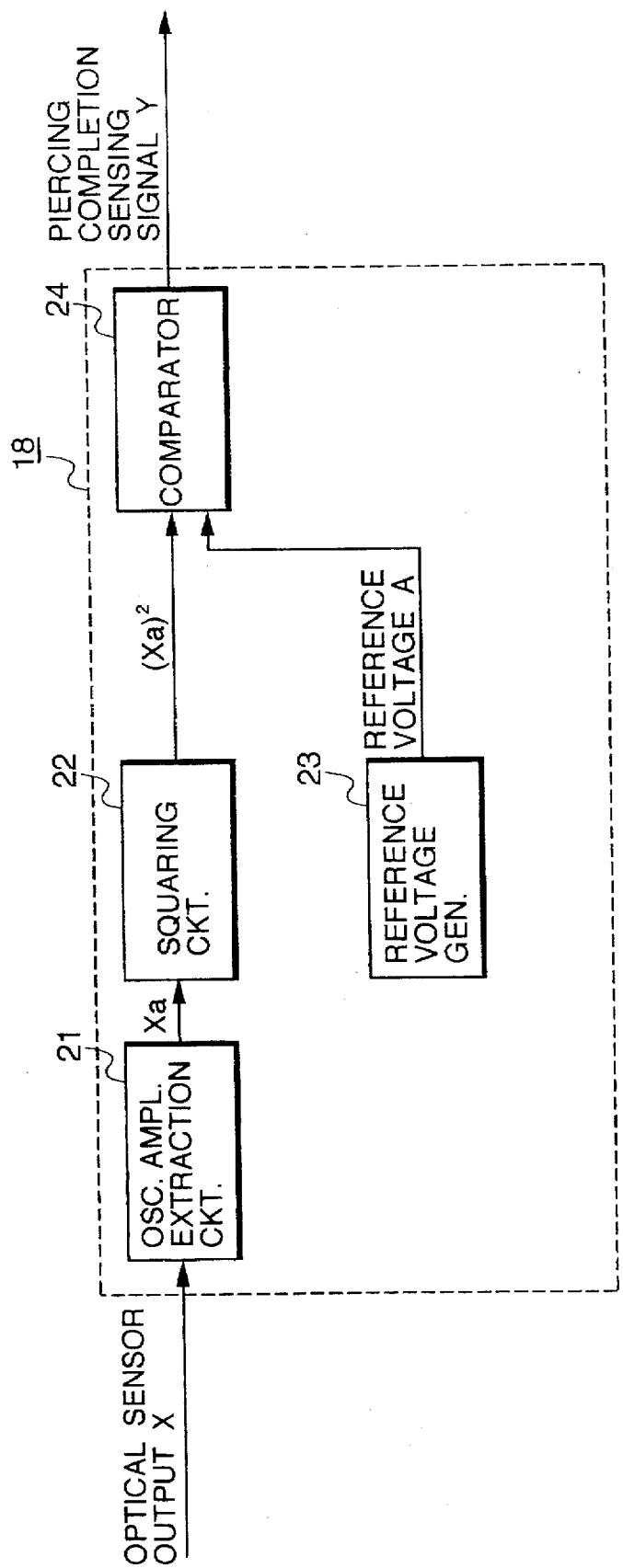

LASER RADIATION POINT

LASER MACHINING SYSTEM WITH CONTROL BASED ON MACHINING STATE RECOGNITION

BACKGROUND OF THE INVENTION

The present invention relates to a laser machining system which incorporates light detection means for optically detecting light occurring at a work point accompanying laser machining of a workpiece or reflected light when a workpiece is irradiated, and which controls laser machining in response to the detection result.

A conventional laser machining system is known which incorporates light detection means for detecting light of wavelengths other than that of the machining laser light beam, specifically, light generated by melting occurring at the radiation point on a workpiece being laser-machined. This has been done, for example, to monitor the machining state, such as completion of piercing performed at the cutting start point and sensing that burning occurs during cutting.

FIG. 24 is a block diagram showing the configuration of a conventional laser machining system incorporating such a light detection means, for example, as shown in Japanese Patent Laid-Open No. Hei 1-170591. In the figure, reference numeral 1 is a laser oscillator for outputting laser light 2 having substantially a single wavelength, reference numeral 3 is a machining lens for collecting the laser light 2 for radiating a work point (laser radiation point) on a workpiece W, and reference numeral 4 is a mirror coated with a reflecting layer 4a for allowing to pass therethrough light 5 of wavelengths other than that of the laser light 2 generated at the laser radiation point on the workpiece W during a piercing operation (for example, infrared rays of a wavelength 780 nm to 5 μm), but reflecting the laser light 2 in the direction of the workpiece W. Reference numeral 6 is a fully reflecting mirror for reflecting the light 5 passing through the mirror 4, reference numeral 7 is a photodetector for outputting an electric signal proportional to the intensity of the light 5 reflected by the mirror 6, reference numeral 8 is an amplifier for amplifying the output signal from the photodetector 7, and reference numeral 9 is a controller for controlling an output of the laser oscillator 1.

In operation, laser light 2 in the form of horizontal oscillating pulses from the laser oscillator 1 is diverted vertically to the workpiece W by the reflecting layer 4a of the mirror 4 for reflecting the laser light 2. The reflected light 2 is gathered at a desired point (laser radiation point) on the workpiece W by means of the machining lens 3 and a focus adjustment mechanism provided in the optical path of the laser light 2 between the mirror 4 and the workpiece W for radiating the workpiece W. Light 5 having a wavelength distinctly different from that of the laser light 2 and extending coaxially or in parallel with the laser light reflected by the mirror 4 is generated by molten material generated at the laser radiation point on the workpiece W due to the radiation by the laser light 2. This light 5 passes through the mirror 4 and is reflected via the mirror 6 to the photodetector 7.

The light 5 and the laser light 2 differ distinctly in wavelength at the mirror 4 and thus can be separated completely by the reflecting filter forming the reflecting layer 4a of the mirror 4. This reflecting filter is applied as an evaporation layer on a support for transmitting the light 5, such as a glass plate, for reflecting the arriving laser light 2 in the direction of the workpiece W, but allowing the light 5 radiated from the workpiece W to substantially pass therethrough. The reflecting filter can also be formed as a multilayer interference filter having a cutoff region for cutting off the laser light 2 and a transmission region for transmitting the light 5.

An electric signal proportional to the intensity of the light 5 is output from the photodetector 7 and is amplified to the amplifier 8. The amplified result is then applied as an actual value to the controller 9, which in turn controls the laser output, namely, the energy of the laser light 2, so that it is held at a target value previously input to the controller.

Generally, laser light output from a laser oscillator contains a linearly polarized component. The absorption ratio of the laser light by a workpiece W varies depending on the machining direction because of this linearly polarized component of the laser light, causing anisotropy to occur in the machined region. Therefore, normally the laser light output from the laser oscillator needs to be made circularly polarized so that anisotropy does not occur in the machined region.

FIG. 25 is an illustration showing a method of converting linearly polarized light output from a laser oscillator into circularly polarized light. Linearly polarized light can be converted into circularly polarized light by forming a dielectric multilayer film as an optical film designed so that a phase difference of 90° (λ/4) occurs between S and P polarization components of the laser light reflected at incident angle (azimuth 45°) where the polarization plane of the linearly polarized light forms an angle of 45° with the S or P polarization axis for the reflecting surface of a mirror set at an incidence angle of 45°. Such a mirror is called a circular polarization mirror. The S polarization is a component having a polarization plane vertical to the incident face, while the P polarization is a component having a polarization plane vertical thereto, namely, parallel to the incident face.

In the conventional laser machining system including a light detection means for detecting light of a wavelength other than laser light, namely, light generated by a melt formed at the laser radiation point on a workpiece during laser machining as described above, a mirror having a reflecting layer is not employed for polarization, but circularly polarized light becomes elliptically polarized light because a slight phase difference change occurs. The linear polarization component of laser light at the work point cannot be suppressed, causing anisotropy to occur in the machining quality. That is, the conventional mirror having the reflecting layer cannot detect light generated at a laser radiation point without adversely affecting the laser light used for laser machining.

SUMMARY OF THE INVENTION

It is therefore a first object of the invention to provide a laser machining system which comprises a mirror having a reflecting layer for transmitting or reflecting laser light and light generated at a laser radiation point and which can perform laser machining without degrading the laser light quality.

It is, in addition to the first object, a second object of the invention to provide a laser machining system which can always perform optimal photodetection.

It is, in addition to the second object, a third object of the invention to provide a laser machining system which prevents erroneous detection.

It is, in addition to the third object, a fourth object of the invention to provide a laser machining system which can quickly feed back the detection result to laser oscillator.

It is, in addition to the second object, a fifth object of the invention to provide a laser machining system which can reliably detect the position of a workpiece.

It is, in addition to the second object, a sixth object of the invention to provide a laser machining system which enables high-speed laser machining by automatically detecting a machining path in laser machining with the machining path marked.

To these ends, according to the invention, there is provided a laser machining system comprising laser oscillator means for producing laser light for machining a workpiece, a circular polarization mirror for converting laser light output from the laser oscillator means into circularly polarized laser light, optical means for collecting the circularly polarized laser light into which the laser light is converted by the circular polarization mirror and radiating the workpiece with the collected light, a phase difference control mirror placed between the optical means and the circular polarization mirror for reflecting the circularly polarized laser light to the optical means while a phase difference between S and P polarization components is maintained and transmitting light to a work point on the workpiece by radiation of the workpiece with the circularly polarized laser light, photodetecting means for detecting light transmitted through the phase difference control mirror and generating a light detection signal in response thereto, laser machining recognition means for recognizing a laser machining state based on the light detection signal from the photodetecting means and outputting a laser machining state recognition signal, and control means for controlling laser machining for the workpiece based on the laser machining state recognition signal output by the laser machining recognition means.

The laser machining system further includes amplification means for changing an amplification factor of the light detection signal output by the photodetecting means in response to the optical path length between the workpiece and the photodetecting means for making the output level of the light detection signal constant when the signal is output to the laser machining recognition means.

Further, the phase difference control mirror is located at a position nearest to a work point so as to make the optical path distance between the photodetecting means and the workpiece constant.

According to another aspect of the invention, there is provided a laser machining system comprising laser oscillator means for producing laser light for machining a workpiece, optical means for collecting the laser light produced by the laser oscillator means and radiating the workpiece with the collected light, photodetecting means for detecting light produced at a work point on the workpiece due to radiation of the workpiece by the laser light and outputting a light detection signal, laser machining recognition means comprising an amplification section for amplifying an oscillation amplitude voltage in a sampling period in the light detection signal output from the photodetecting means, the laser machining recognition means for comparing the amplified oscillation amplitude voltage in the sampling period with a predetermined reference voltage for recognizing a laser machining state and outputting a laser machining state recognition signal, and control means for controlling laser machining of the workpiece based on the laser machining state recognition signal.

According to another aspect of the invention, there is provided a laser machining system comprising laser oscillator means for producing laser light for machining a workpiece, optical means for collecting the laser light produced by the laser oscillator means and radiating the workpiece with the collected light, photodetecting means for detecting light produced at a work point on the workpiece due to radiation of the workpiece by the laser light and outputting a light detection signal, laser machining recognition means comprising a filter section for extracting only a frequency component required for recognizing a laser machining state from the light detection signal output from the photodetecting means, the laser machining recognition means comparing the voltage of the frequency component provided through the filter section with a predetermined reference voltage for recognizing a laser machining state and outputting a laser machining state recognition signal, and control means for controlling laser machining for the workpiece based on the laser machining state recognition signal.

A low-frequency component, extracted in the filter section using a cutoff frequency of several tens of Hz to several hundred Hz so as to obtain only a frequency component required for recognizing a laser machining state, is compared with a predetermined reference voltage for sensing a blow-up phenomenon.

Further, a low-frequency component, extracted in the filter section using a cutoff frequency of less than several tens of Hz so as to obtain only a frequency component required for recognizing a laser machining state, is compared with a predetermined reference voltage for sensing a burning phenomenon.

The reference voltage used for comparison is changed in response to the material of the workpiece or the output of the laser oscillator.

According to another aspect of the invention, there is provided a laser machining system comprising laser oscillator means for producing laser light for machining a workpiece, optical means for collecting the laser light produced by the laser oscillator means and radiating the workpiece with the collected light, photodetecting means for detecting a light emission distribution of light produced at a work point on the workpiece due to radiation of the workpiece by the laser light and outputting a light detection signal, laser machining recognition means for recognizing a laser machining state based on the form of the light emission distribution of light occurring at the work point on the workpiece in the light detection signal and outputting a laser machining state recognition signal, and control means for controlling laser machining for the workpiece based on the laser machining state recognition signal.

The laser machining system further includes laser oscillation command means for controlling laser oscillation conditions of the laser oscillator means, such as output peak value, frequency, duty cycle, etc., based on the laser machining state recognition signal from the laser machining recognition means, with control being performed only by the laser oscillation command means.

The laser machining system further includes means for radiating a workpiece apart from the laser oscillator means for machining a workpiece, and the laser machining recognition means detects an end position of the workpiece from light intensity reflecting radiation light of the radiation means.

Further, the laser machining recognition means detects the position of the workpiece based on light at at least three positions where the intensity of the reflected light changes.

The laser machining recognition means detects a machining path line marked on a workpiece, which differs from the workpiece in reflection factor, based on light reflected from the workpiece, and the control means performs laser machining based on machining path information from the laser machining recognition means.

In the laser machining system thus configured, circularly polarized laser light is reflected by the phase difference control mirror as circularly polarized laser light with the phase difference between both S and P polarization components maintained, and light generated at the work point on a workpiece is allowed to pass through and be detected by the photodetecting means.

Since the system is provided with the amplification means for changing the amplification factor so as to make the light detection signal output level constant in response to the optical path length, even if the light detection signal output level changes as the optical path length changes, a light detection signal at the same level, i.e., independent of the optical path length, is output.

Further, the phase difference control mirror is located at the position nearest the work point, and the optical path distance between the photodetecting means and the workpiece is made constant, so that a light detection signal at the same level dependent on only the machining state at the work point is always output from the light detection means.

The laser machining recognition means is provided with the amplification section for amplifying the oscillation amplitude voltage in the sampling period in the light detection signal and effecting a difference depending on oscillation amplitude change when the amplified oscillation amplitude voltage is compared with a reference voltage.

The filter section for extracting only the frequency component required for recognizing the laser machining state from the light detection signal extracts only the frequency component required for comparison without erroneous recognition as reference voltage.

The filter section has a cutoff frequency of several tens of Hz to several hundred Hz to detect blow-up with good responsivity, namely, in a condition in which the rising edge of the voltage of a predetermined frequency component can be quickly recognized.

Further, the filter section uses a cutoff frequency having a frequency component of less than several tens of Hz to securely detect the rising edge of the voltage of a predetermined frequency component and detects burning based on the detection result.

The reference voltage used for comparison is changed in response to the material of the workpiece or the output of the laser oscillator, and the laser machining state can always be detected by comparison with the reference voltage.

The light emission distribution of light occurring at the work point on the workpiece is detected, and the laser machining state at the work point is detected based on the form of the detected light emission distribution.

The laser oscillation command means directly controls the laser oscillation conditions of laser oscillator means, such as output peak value, frequency, duty cycle, etc., not via the control circuit based on the laser machining state recognition signal from the laser machining recognition means.

The laser machining system further includes means for radiating a workpiece apart from the laser oscillator means for machining the workpiece, and the end position of the workpiece on the machining table is detected in response to the intensity of light emitted from the workpiece radiated by the radiation means.

At least three positions where reflected light intensity changes are detected, and the position of the workpiece on the machining table is detected from the positional relationships among the ends of the three positions.

A machining path line marked on the surface of a workpiece, which differs from the workpiece in reflection factor, is detected based on the light emission intensity difference between the workpiece surface and the machining path line marked thereon caused by reflection or light emission, and laser machining is performed based on the detection result.

BRIEF DESCRIPTION OF THE DRAWINGS

FIG. 2 is a block diagram showing the configuration of an optical sensor detection signal processor of the invention;

DESCRIPTION OF THE PREFERRED EMBODIMENTS

Embodiment 1

Figure 1:
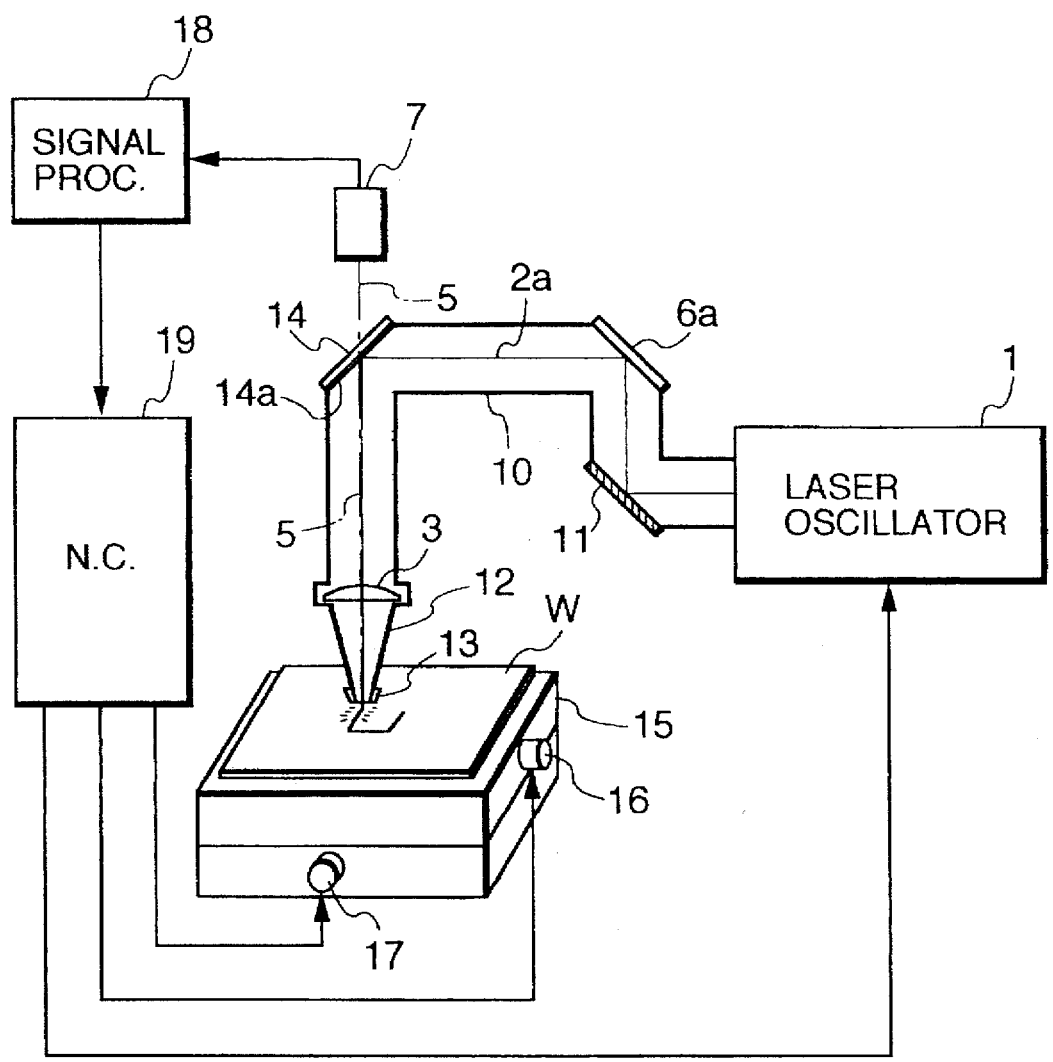
FIG. 1 is a block diagram showing the configuration of a laser machining system according to a first embodiment of the invention.

FIG. 1 is a block diagram showing the configuration of a laser machining system according to a first embodiment of the invention. In the figure, reference numeral 1 is a laser oscillator for outputting linearly polarized laser light having substantially a single wavelength, reference numeral 2a is circularly polarized laser light into which linearly polarized laser light is converted by a circular polarization mirror 11 for converting linearly polarized laser light into circularly polarized light, reference numeral 3 is a machining lens used as optical means for collecting the circularly polarized laser light 2a for radiating a work point (laser radiation point) on a workpiece W, reference numeral 5 is light of a wavelength other than the circularly polarized laser light 2a, generated, for example, by molten metal at the laser radiation point on the workpiece W in working the workpiece W, and reference numeral 6a is one or more optical path mirrors located in an optical transmission path 10 and having a reflecting surface formed by, for example, a gold-evaporated film having a small phase difference change of about 1.1° caused by reflection of the circularly polarized laser light 2.

Reference numeral 7 is an optical sensor, namely, photo-detecting means for outputting an electric signal (light detection signal) proportional to the intensity of the light 5, reference numeral 12 is a machining head containing a machining lens 3 and a nozzle 13, and reference numeral 14 is a phase difference control mirror having a dielectric multilayer film designed so as to allow the light 5 generated at a laser radiation point in working the workpiece W to pass through but reflecting the circularly polarized laser light 2 while the phase difference between S and P polarization components is substantially maintained. This phase difference control mirror 14 has a reflecting layer 14a coated with two types of dielectrics different in refractive index, such as ThF$_4$ and ZnSe films, alternatingly formed on a ZnSe substrate capable of transmitting the light 5 generated at the laser radiation point.

Reference numeral 15 is a machining table having an X-axis drive motor 16 and a Y-axis drive motor 17, reference numeral 18 is an optical sensor detection signal processor employed as laser machining recognition means for recognizing the laser machining state based on an output signal from the optical sensor 7 (optical sensor output X) and outputting a laser machining state recognition signal, and reference numeral 19 is a numerical controller for controlling the laser oscillator 1, the X-axis drive motor 16, and the Y axis drive motor 17.

Figure 3A:
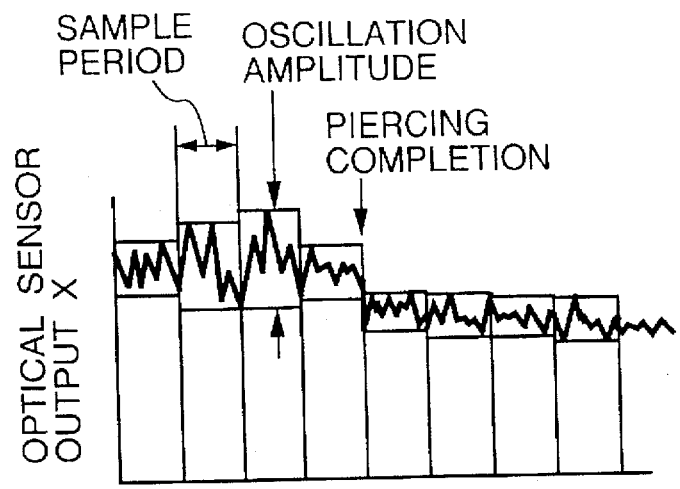
FIGS. 3(a)-3(d) are signals waveform chart for the optical sensor detection signal processor of the invention.
Figure 3B:
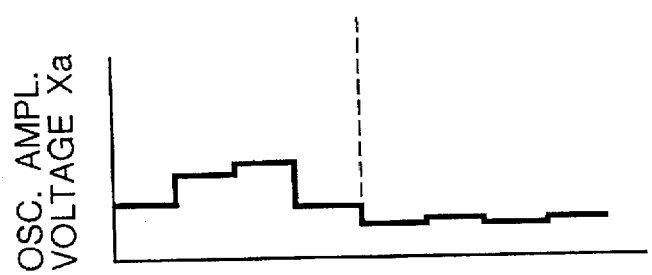
Figure 3C:
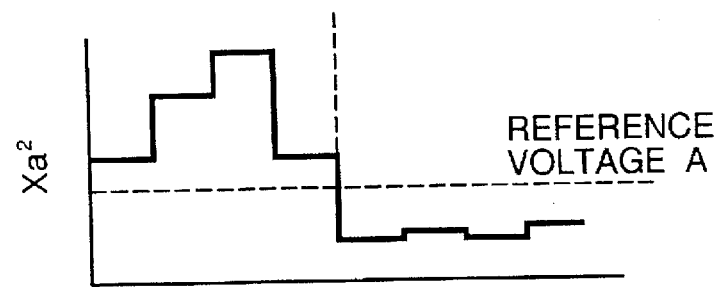
Figure 3D:
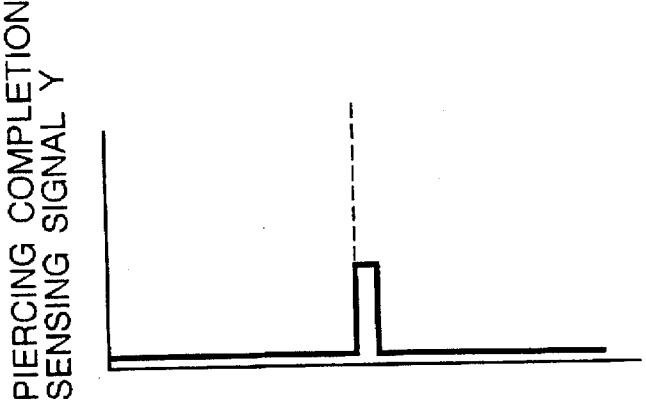

FIG. 2 is a block diagram showing the configuration of the optical sensor detection signal processor 18, wherein reference numeral 21 is an oscillation amplitude voltage extraction circuit for extracting an oscillation amplitude voltage $X_a$ (see FIG. 3(b)) by holding the oscillation amplitude within the sampling period of the optical sensor output X (see FIG. 3(a)) from the optical sensor 7, reference numeral 22 is a squaring circuit for squaring the oscillation amplitude voltage $X_a$ to determine the squared oscillation amplitude voltage $X_a^2$ (see FIG. 3(c)), reference numeral 23 is a reference voltage generator for generating a predetermined reference voltage A (see FIG. 3(d)), and reference numeral 24 is a comparator for comparing the squared oscillation amplitude voltage $X_a^2$ output from the squaring circuit 22 with the reference voltage A generated by the reference voltage generator 13. The comparison result of the comparator 24 is output to the numerical controller 19 as a piercing completion sensing signal Y, i.e., as the laser machining state recognition signal.

The operation of the embodiment will be discussed, for example, with reference to a piercing operation in laser machining.

Figure 25:
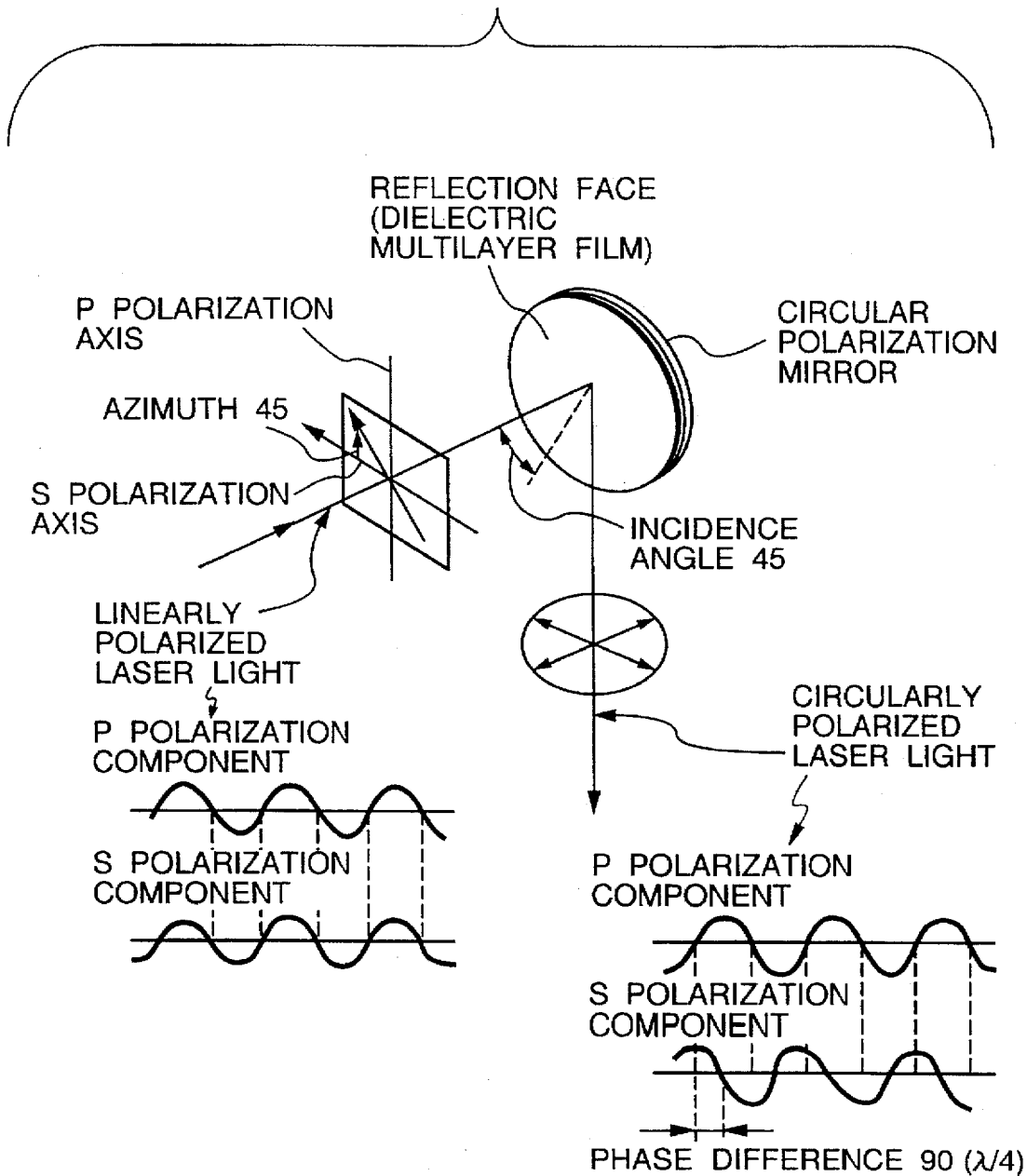
FIG. 25 is an illustration showing a method of converting linearly polarized light into circularly polarized light.

Linearly polarized laser light output from the laser oscillator 1 is converted into circularly polarized laser light 2a having a circular polarization degree of nearly 100%, for example, by the circular polarization mirror 11 previously described with reference to FIG. 25. The circularly polarized laser light 2a output from the circular polarization mirror 11 is reflected and diverted by the optical path mirror 6a with a phase difference change about 1.1° or less. Then, the circularly polarized laser light 2a is reflected by the phase difference control mirror 14 in the direction of the workpiece W without impairing its circular polarization while the phase difference between both the S and P polarization components is substantially maintained.

The circularly polarized laser light 2a reflected by the phase difference control mirror 14 is collected through the machining lens 3 in the machining head 12 at a desired point (laser radiation point) of the workpiece W for radiation.

Light 5 having a wavelength distinctly different from that of the circularly polarized laser light 2a and extending coaxially or dispersed with respect to the circularly polarized laser light 2a reflected by the phase difference control mirror 14 is generated by a melt formed at the laser radiation point on the workpiece W by radiation with the circularly polarized laser light 2a. This light 5 passes through the phase difference control mirror 14 and is input to the optical sensor 7. Since molten metal tends to be vigorously discharged from a hole before the hole is completely pierced, the waveform of the optical sensor output X (see FIG. 3(a)) oscillates strongly. When the hole is completely pierced, discharge of molten metal stops, and thus the waveform amplitude of the optical sensor output X drops. Utilizing this tendency, completion of piercing a hole as a laser machining state is sensed as follows:

An electric optical sensor output X proportional to the intensity of light 5 corresponding to the discharge of molten metal is output from the optical sensor 7 and input to the oscillation amplitude voltage extraction circuit 21 in the optical sensor detection signal processor 18. The oscillation amplitude voltage extraction circuit 21 extracts the oscillation amplitude voltage $X_a$ by holding the oscillation amplitude of the waveform of the optical sensor output X in a predetermined sampling period. The oscillation amplitude voltage $X_a$ is input to the squaring circuit 22 for squaring the voltage for providing squared oscillation amplitude voltage $X_a^2$ with an increased voltage level difference before and after the completion of piercing a hole. Next, the comparator 24 compares the squared oscillation amplitude voltage $X_a^2$ with a predetermined reference voltage A generated by the reference voltage generator 23 for determining whether or not piercing the hole is complete. When the squared oscillation amplitude voltage $X_a^2$ is greater than the reference voltage A, the oscillation amplitude of the optical sensor output X is large, and therefore it is determined that piercing is not complete. When the squared oscillation amplitude voltage $X_a^2$ becomes smaller than the reference voltage A, it is determined that piercing is complete, and a piercing completion sensing signal Y is output to the numerical controller 19.

The numerical controller 19 controls, for example, the laser output (terminates laser output from the laser oscillator 1) based on the piercing completion sensing signal Y.

Although the optical sensor 7 has herein been discussed as the photodetecting means for outputting an electric signal in proportion to the intensity of the light 5 in the first embodiment, such a photodetecting means may be implemented as detection means for detecting light 5 generated at a laser radiation point and outputting an electric signal in a single light reception device, such as an Si photodiode or an image pick-up device such as a CCD with an array of integrated light reception devices sensitive to visible to near-infrared rays produced due to thermal radiation of molten metal. When a single light reception device such as an Si photodiode is used as the detection means, a light intensity change at the work point can be detected; when an image pick-up device such as a CCD having an array of integrated light reception devices is used, an actual image at the work point can be detected.

Thus, the phase difference control mirror 14 is placed in the optical transmission line in place of the optical path mirror 6a, whereby a workpiece W can be radiated with the circularly polarized laser light 2a used for laser machining converted into light having a nearly 100% circular polarization degree by the circular polarization mirror 11 without degrading the beam quality of laser light mode, phase distribution, etc., due to thermal inductive optical distortion or lowering the circular polarization ratio due to a phase difference change. Work accuracy of the workpiece W therefore can be maintained.

Outputting of the piercing completion sensing signal Y to the numerical controller 19 eliminates the need for setting the piercing time, which formerly was required to be manually preset. The transition to cutting of the workpiece W can also be made immediately after the piercing completion sensing signal is output. Thus, the machining time can be reduced.

Further, if an image pick-up device such as a CCD having light reception devices integrated in an array is used as the detection means, an actual image at a laser radiation point can be optically detected, and while the laser machining state is directly observed and checked in detail from image information, laser machining can also be performed.

Further, since the optical sensor 7 need not be placed near the workpiece W, stable photodetection is enabled for long periods without danger of the sensor 7 becoming fouled due to fumes or sputtering occurring during laser machining or burning of the optical sensor 7 due to laser light reflected from the workpiece W.

Embodiment 2

Figure 4:
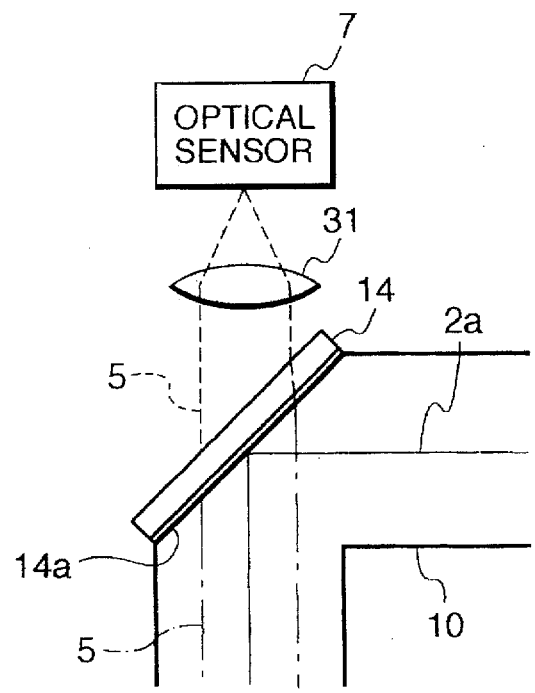
FIG. 4 is a block diagram showing the configuration of a laser machining system according to a second embodiment of the invention.

In the first embodiment, light 5 other than circularly polarized laser light 2a generated at a laser radiation point transmitted by the phase difference control mirror 14 is allowed to pass through and is output directly to the optical sensor 7. In the second embodiment, a lens 31 is provided for collecting light 5 generated at the laser radiation point on the light reception face of an optical sensor 7, as shown in FIG. 4. The focal distance of the lens 31 is set so that an image can be formed on the light reception face of the optical sensor 7 by combination with the lens function of a machining lens 3.

Thus, most of the light 5 generated at a laser radiation point and returned to an optical transmission line 10 can be received, so that the detection sensitivity can be improved. If the optical sensor 7 is used as an image pick-up device, the actual image at the laser radiation point can be formed on the light reception face of the image pick-up device and the machining state of a workpiece W, such as the state of piercing, can be detected from the image.

The lens 31 may be made of a combination of lens whose focal distance can be adjusted. Even if the focal distance of the machining lens 3 is changed in response to machining, such a combined lens enables an image to be formed on the light reception face of the optical sensor 7, providing an unblurred image.

Embodiment 3

Figure 5:
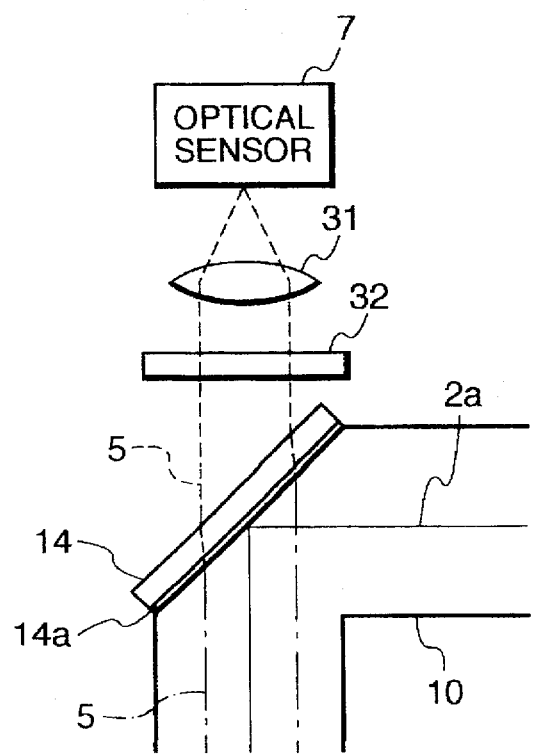
FIG. 5 is a block diagram showing the configuration of a laser machining system according to a third embodiment of the invention.

In the third embodiment, an optical filter 32 made of colored glass, etc., capable of transmitting or attenuating light in a specific wavelength band is provided between a lens 31 and a phase difference control mirror 14, as shown in FIG. 5.

Such an optical filter 32 is placed preceding an optical sensor 7, whereby the circularly polarized laser light 2a component can be completely cut off and the light reception amount of the optical sensor 7 can be adjusted, enabling photodetection without saturation. Thus, details of the machining state can be monitored by detecting the actual image at a laser radiation point from image information.

Embodiment 4

Figure 6:
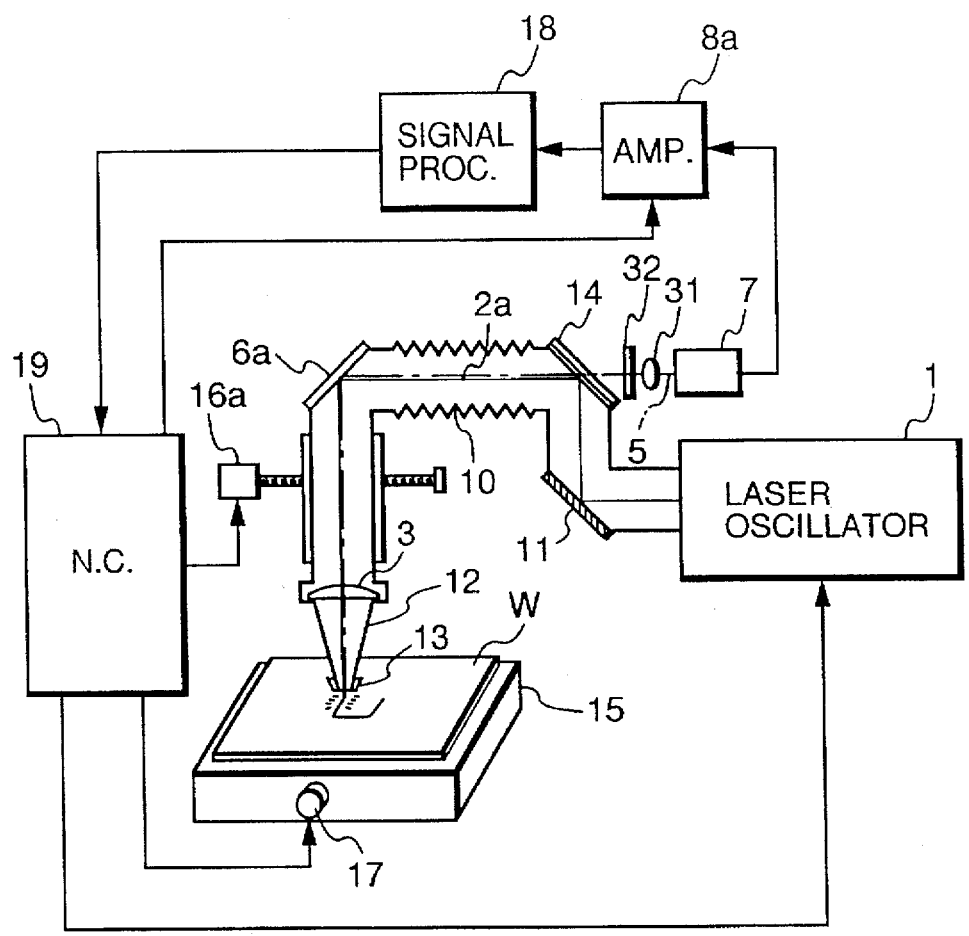
FIG. 6 is a block diagram showing the configuration of a laser machining system according to a fourth embodiment of the invention.
Figure 7:
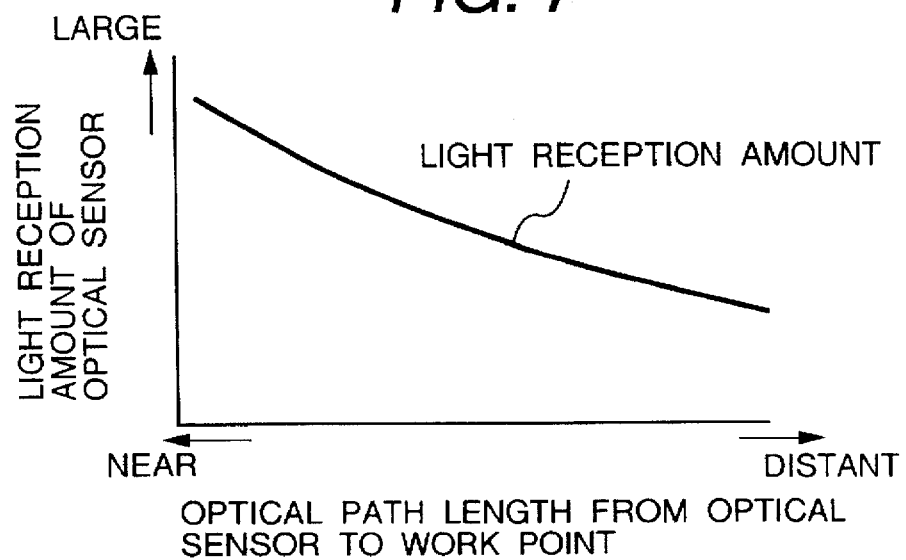
FIG. 7 is a chart showing light reception amount change of an optical sensor in the fourth embodiment of the invention.

FIG. 6 is a block diagram showing the configuration of a laser machining system according to a fourth embodiment of the invention. FIG. 7 is a chart showing the amount of change in light reception as a function of the optical path length from the optical sensor to the work point (laser radiation point). Components identical with or similar to those previously described with reference to the preceding figures are denoted by the same reference numerals in FIG. 6 and will not be discussed again. Reference numeral 8a is a variable gain amplifier used to offset change of the light reception amount of an optical sensor 7 (so as to always provide a constant photodetection signal output level from the optical sensor) according to a command transferred from a numerical controller 19 in response to the travel distance of a machining head 12. Reference numeral 16a is an X-axis drive motor for moving the machining head 12 in the direction of the X axis.

As shown in FIG. 6, for example, to move the machining head 12 driven by the X-axis drive motor 16a for laser machining, a photodetecting device means composed of a lens 31 and an optical filter 32, in addition to a phase difference control mirror 14 and the optical sensor 7, is placed at a position where the optical path length to the laser radiation point changes. In this case, the light reception amount of the optical sensor 1 changes as shown in FIG. 7, and the output from the optical sensor 7 changes likewise.

The numerical controller 19 in the fourth embodiment causes the amplifier 8a to change the output signal amplification factor so as to offset the change of an output signal (optical sensor output X) indicating the light reception amount of the optical sensor 7 responsive to the travel distance of the machining head 12 moved by the X-axis drive motor 16a in synchronization with control applied to the X-axis drive motor 16a from the numerical controller 19.

Thus, using the amplifier 8a, the amplification factor of the output signal from the optical sensor 7 associated with travel change of the machining head 12 from the numerical controller 19 is changed so that the output from the optical sensor 7 to an optical sensor detection signal processor 18 is held constant, enabling photodetection of higher accuracy, as in the first embodiment.

Embodiment 5

Figure 8:
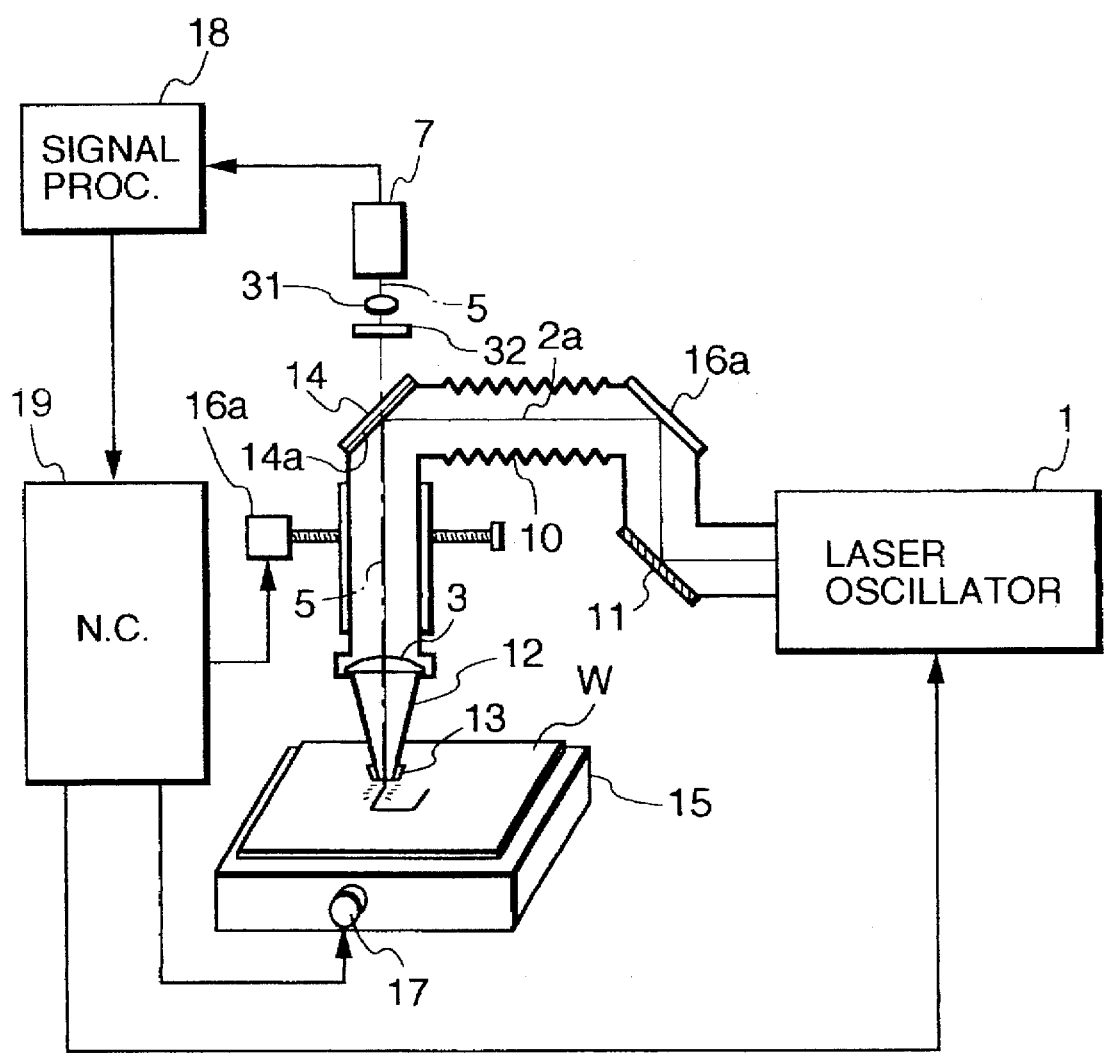
FIG. 8 is a block diagram showing the configuration of a laser machining system according to a fifth embodiment of the invention.

In a fifth embodiment shown in FIG. 8, a phase difference control mirror 14 is placed at a position nearest a laser radiation point, whereby a photodetecting device composed of a lens 31 and an optical filter 32, in addition to an optical sensor 7, can be placed at a position making the optical path length to the workpiece W constant and nearest the laser radiation point on the workpiece W, independently of movement of a machining head 12 by an X-axis drive motor 16a, for example, a position just above the machining lens 5. Such a configuration can produce a similar effect to that of the first embodiment.

Further, the distance to the laser radiation point observed from the optical sensor 7 (optical path length) is made constant, so that the light reception amount of the optical sensor 7 depending on work position is always constant (with no light reception amount change) independently of the laser machining system operation, and the position is near the laser radiation point. Thus, high resolution can be obtained.

Embodiment 6

Figure 9:
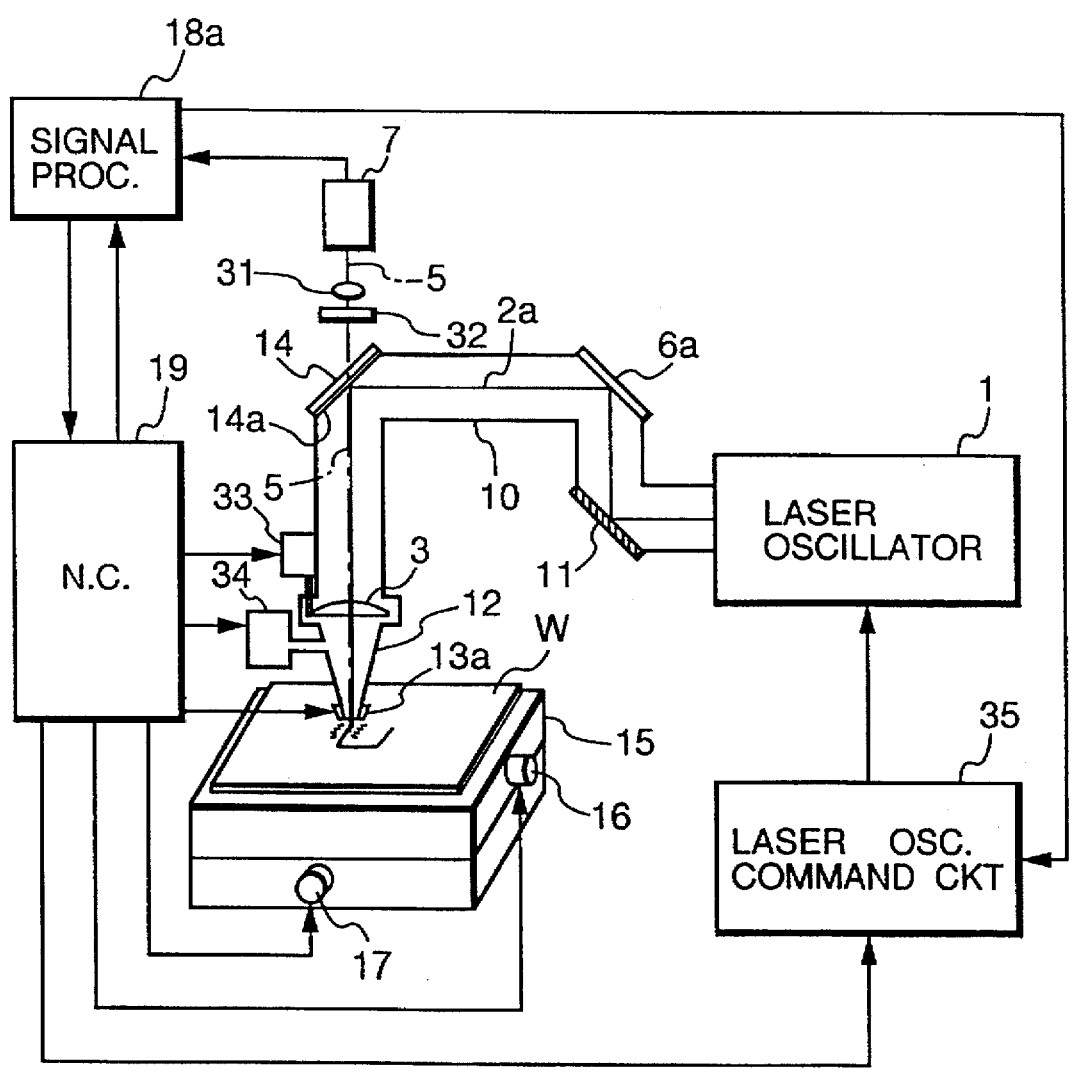
FIG. 9 is a block diagram showing the configuration of a laser machining system according to a sixth embodiment of the invention.

FIG. 9 is a block diagram showing the configuration of a laser machining system according to a sixth embodiment of the invention. Components identical with or similar to those previously described with reference to the preceding figures are denoted by the same reference numerals in FIG. 9 and will not be discussed again. Reference numeral 13a is a driving nozzle which allows the distance between a workpiece W and the nozzle and the nozzle form to be changed. Reference numeral 18a is an optical sensor detection signal processor which includes an image processor, etc., as well as a reference voltage generator 23, a comparator 24, and a filter circuit 25 for performing processing on an output signal of an optical sensor 7 as an input and sending information to a numerical controller 19 and a laser oscillation command circuit 35. Reference numeral 33 is a light collection system drive containing a position encoder for moving a light collection system, such as a machining lens 3, up and down. Reference numeral 34 is a work gas adjustment device for adjusting work gas conditions such as work gas pressure, flow quantity, and type, and reference numeral 35 is a laser oscillation command circuit for applying oscillation conditions of output, frequency, duty cycle, etc., of a laser oscillator 1 to the laser oscillator 1. The numerical controller 19 controls the light collection system drive 33, the driving nozzle 13a, and the work gas adjustment device 34 in addition to a machining table 15, and also sends oscillation condition data to the laser oscillation command circuit 35.

Since the operation of piercing completion detected as the laser machining state in piercing by the laser machining system is discussed in the first embodiment, signal processing after a low-frequency component is obtained by a first or second cutoff frequency experimentally obtained is taken as an example in the sixth embodiment for sensing "blow-up", which is a machining failure phenomenon of the laser machining state occurring during piercing performed at the cutting start point, and "burning", which is a machining failure phenomenon occurring at the cutting time.

Figure 10:
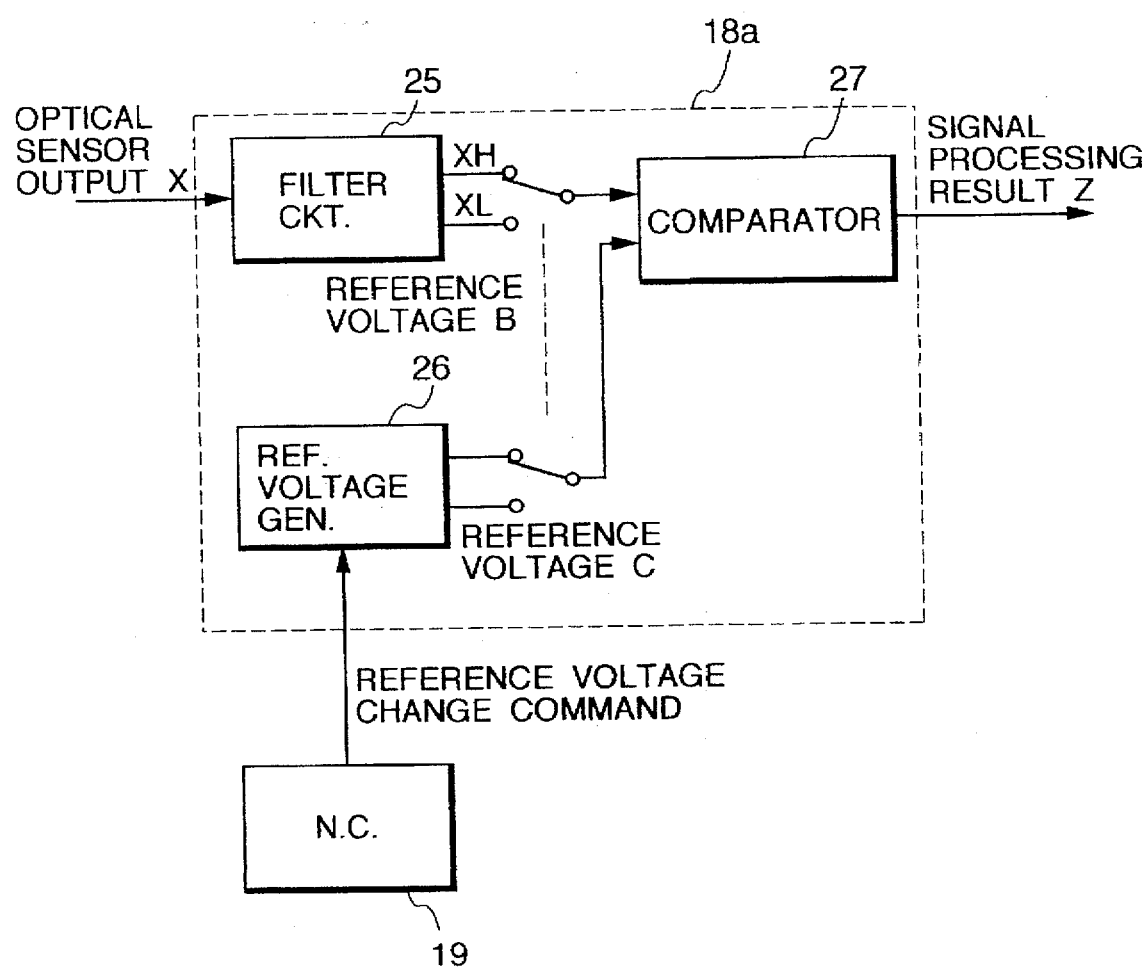
FIG. 10 is a block diagram showing the configuration of an optical sensor detection signal processor in the sixth embodiment of the invention.

FIG. 10 is a block diagram showing the configuration of the optical sensor detection signal processor 18a. Reference numeral 25 is a filter circuit for cutting (1) the high-frequency peak component of optical sensor output X from the optical sensor 7 (waveform shown in FIG. 11(a) or FIG. 12(a)) using a first cutoff frequency to generate a filtered waveform $X_H$, (2) a low-frequency component (waveform shown in FIG. 11(b)) using a second cutoff frequency to generate filtered waveform $X_L$, and (3) a low-frequency component (waveform shown in FIG. 12(b)) for extracting only frequency components required for recognizing the laser machining state. Reference numeral 26 is a reference voltage generator for generating reference voltages B and C to be compared with the filtered waveforms $X_H$ and $X_L$ by the comparator 27.

Next, the operation will be discussed.

The function and operation of the laser oscillator 1, phase difference control mirror 14, etc., are similar to those in the embodiments described above and therefore will not be discussed again. The operation of sensing blow-up occurring during piercing and burning occurring during cutting will be discussed.

Figure 11A:
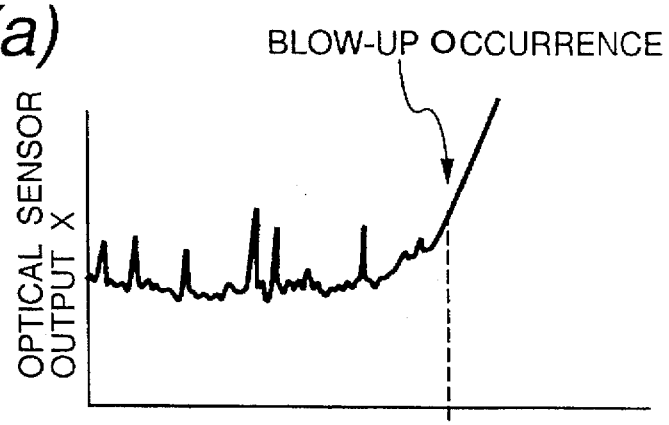
FIGS. 11(a)-11(b) shows a series of waveform charts for the optical sensor detection signal processor in a blow-up sensing process in the sixth embodiment.
Figure 11B:
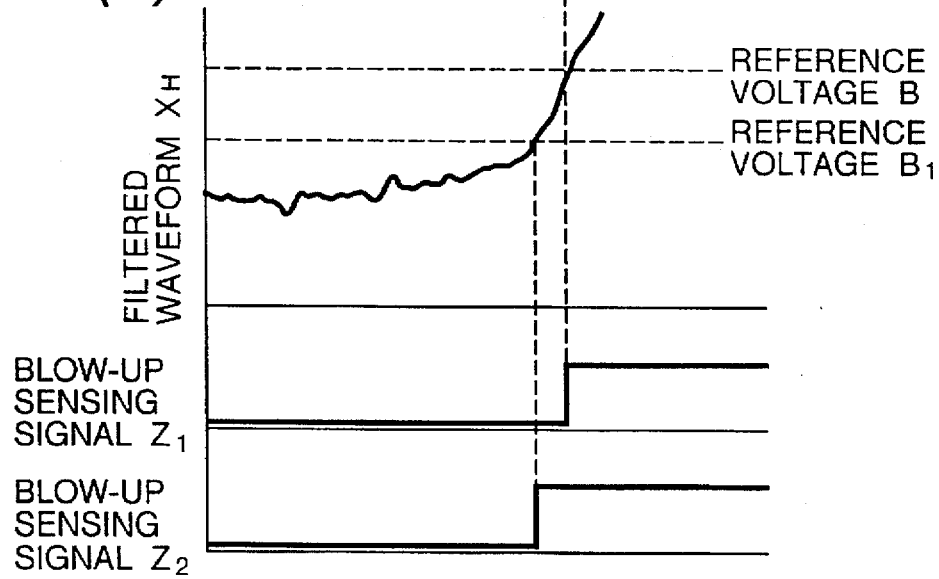

When blow-up occurs during piercing, the temperature surrounding the laser radiation point rises, and thus the light emission part caused by thermal radiation increases, the intensity of light 5 generated from the laser radiation point detected by the optical sensor 7 increases, and the optical sensor output X increases, as shown in FIG. 11(a). The increase in the optical sensor output X is recognized by comparison with the reference voltage B, whereby the blow-up can be sensed.

Since blow-up occurs in a condition in which the laser radiation point does not move as in piercing, etc., if it is not detected quickly, the machining accuracy of the workpiece W greatly drops. Thus, blow-up detection responsivity must be considered. Specifically, the filter circuit 25 shown in FIG. 10 cuts the peak component of the frequency component detected by the optical sensor 7, which may lead to erroneous recognition in comparison with the reference voltage using the first cutoff frequency, which is comparatively high, for example, in the range of several tens of Hz to several hundred Hz. While the rising slope of the optical sensor output X prior to blow-up occurrence is held, a temporarily high output which may lead to erroneous recognition is cut for providing the waveform $X_H$ in FIG. 11(b). The comparator 27 compares the filtered waveform $X_H$ with reference voltage B generated by the reference voltage generator 26 for providing a blow-up occurrence sensing signal $Z_1$, which is a machining failure sensing signal.

Further, a rise in the optical sensor output X before the occurrence of blow-up is compared with reference voltage $B_1$, which is slightly lower than reference voltage B, whereby blow-up can be sensed before it actually occurs, and a blow-up prognostic sensing signal $Z_2$, i.e., a machining failure sensing signal, can be provided.

Figure 13A:
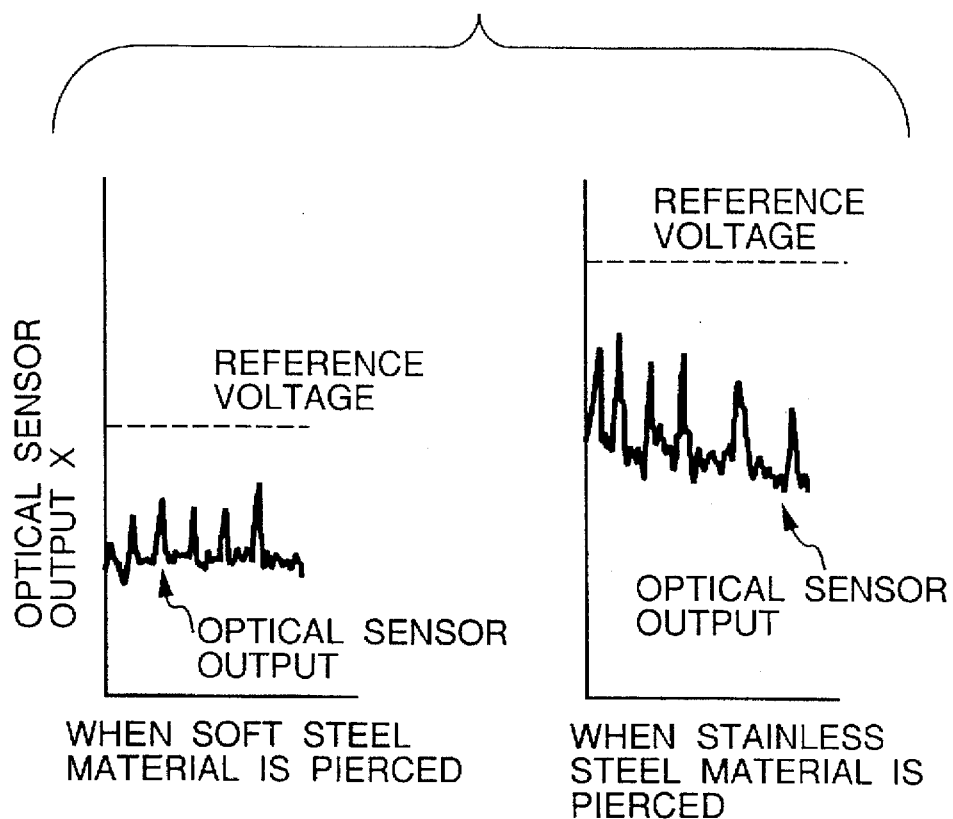
FIGS. 13(a)-13(b) are illustrations for reference voltage change in the sixth embodiment.

Experiments has shown that the optical sensor output X level detected by the optical sensor 7 when soft steel material is pierced differs from that when stainless steel material is pierced, as shown in FIG. 13(a). Then, the reference voltage B generated by the reference voltage generator 26 is varied depending on the workpiece material and is compared with the filtered waveform $X_H$ by the comparator 27, enabling more sensitive blow-up detection.

Figure 12A:
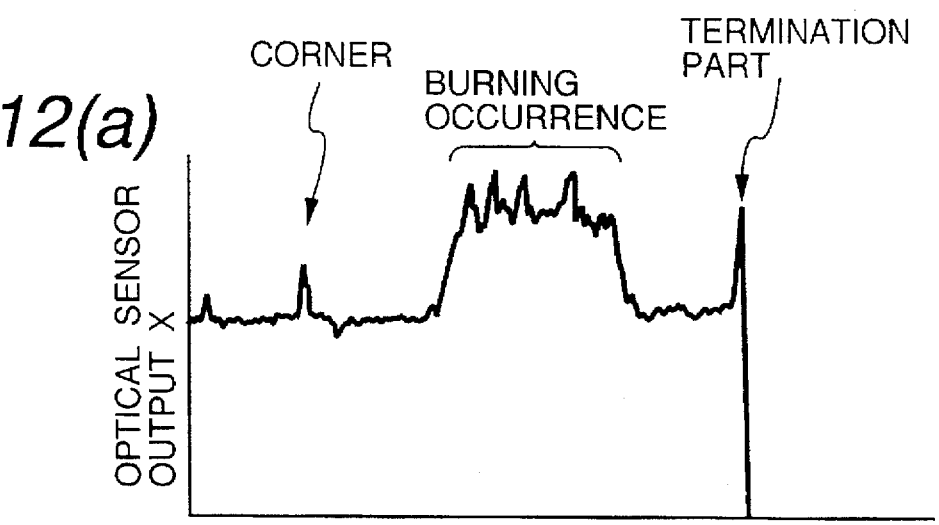
FIGS. 12(a)-12(b) are a series of waveform charts for the optical sensor detection signal processor in a burning sensing process in the sixth embodiment.
Figure 12B:
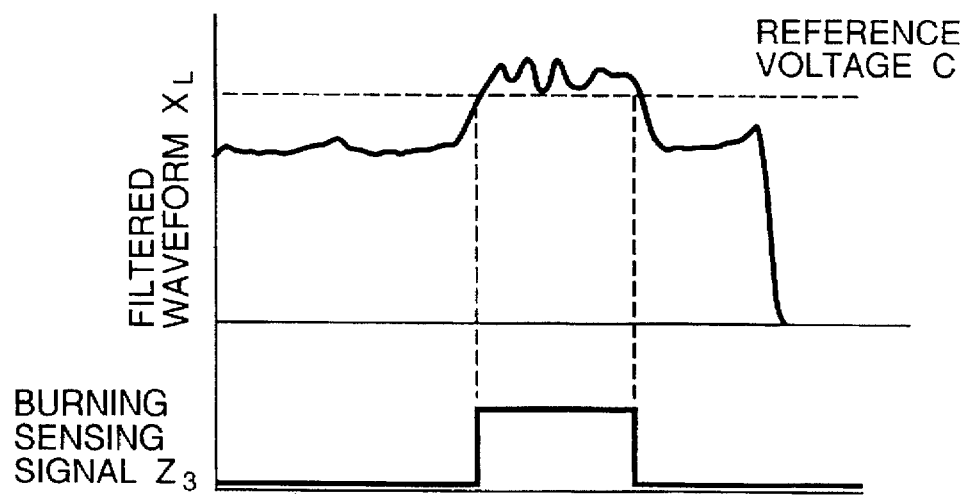

On the other hand, when burning occurs during cutting, the cut groove width widens and the light emission part enlarges because of excessive burning, and thus the optical sensor output X changes as shown in FIG. 12(a). Then, this change can be compared with reference voltage C for sensing burning.

Since burning occurs while a laser radiation point is moving on a workpiece W although blow-up occurs when a laser radiation point does not move, partially it can be said that laser machining is performed while blow-up is occurring. It is more important that burning be reliably detected rather than it be quickly detected. Specifically, the filter circuit 25 shown in FIG. 10 filters optical sensor output X to cut the peak component occurring when a corner is cut or in the cutting termination part. The second cutoff frequency, for example, in the range of less than several tens of Hz used to cut the peak component needs to be made lower than the first cutoff frequency used for sensing blow-up as described above. Thus, the low-frequency component provided by using the second cutoff frequency lower than the first cutoff frequency in the filter circuit 25 is used to sense burning. For example, the peak component is cut using the second cutoff frequency of several Hz, thereby cutting temporarily a high output which may lead to erroneous recognition of optical sensor output X as burning occurrence, thus providing waveform $X_L$ of a low-frequency component of the optical sensor output X shown in FIG. 12(b). The comparator 27 compares the filtered waveform $X_L$ with reference voltage C generated by the reference voltage generator 26 for providing a burning occurrence sensing signal $Z_3$, which is a machining failure sensing signal.

Figure 13B:
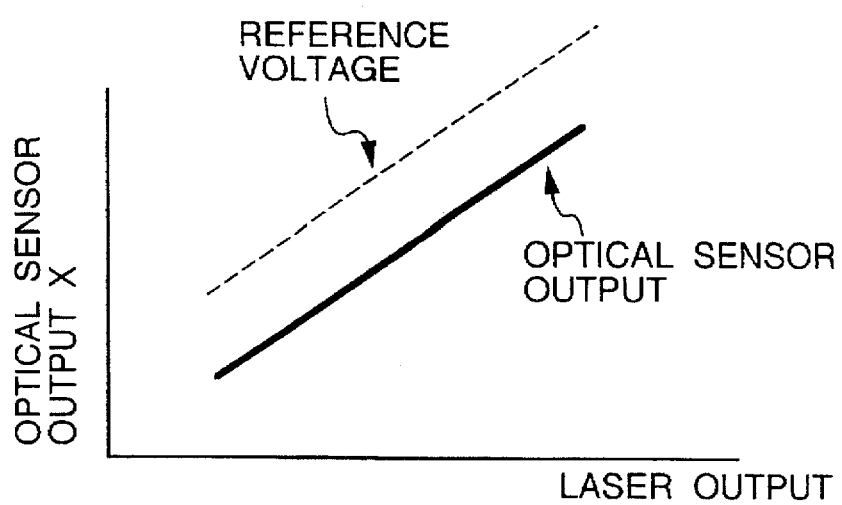

Experiments have found that the optical sensor output X level detected by the optical sensor 7 changes with laser output during cutting, as shown in FIG. 13(b). Then, the reference voltage C generated by the reference voltage generator 26 is varied depending on the laser output and is compared with the filtered waveform $X_L$ by the comparator 27, enabling more sensitive burning detection.

The machining failure detection signals $Z_1$, $Z_2$, and $Z_3$ provided by comparing the waveforms of optical sensor output X with the reference voltages B, $B_1$, and C are transmitted to the numerical controller 19. Based on the received machining failure detection signals $Z_1$, $Z_2$, and $Z_3$, the numerical controller 19 can stop the laser machining system so as to minimize the occurrence of the machining failure, change the focal position of circularly polarized laser light 2a for the light collection system drive 33, or support work gas pressure change for the work gas adjustment device 34 for enabling adaptive control machining such that optimum machining is always maintained.

In the sixth embodiment, laser machining stoppage, focal position change, and work gas adjustment are performed based on the machining failure detection signals $Z_1$, $Z_2$, and $Z_3$, although the embodiment is not limited to this particular case. For example, optimum laser machining may be maintained by changing the feedrate of a workpiece W, controlling the laser output and laser oscillation waveform by the laser oscillation command circuit 35, etc.

Figure 14:
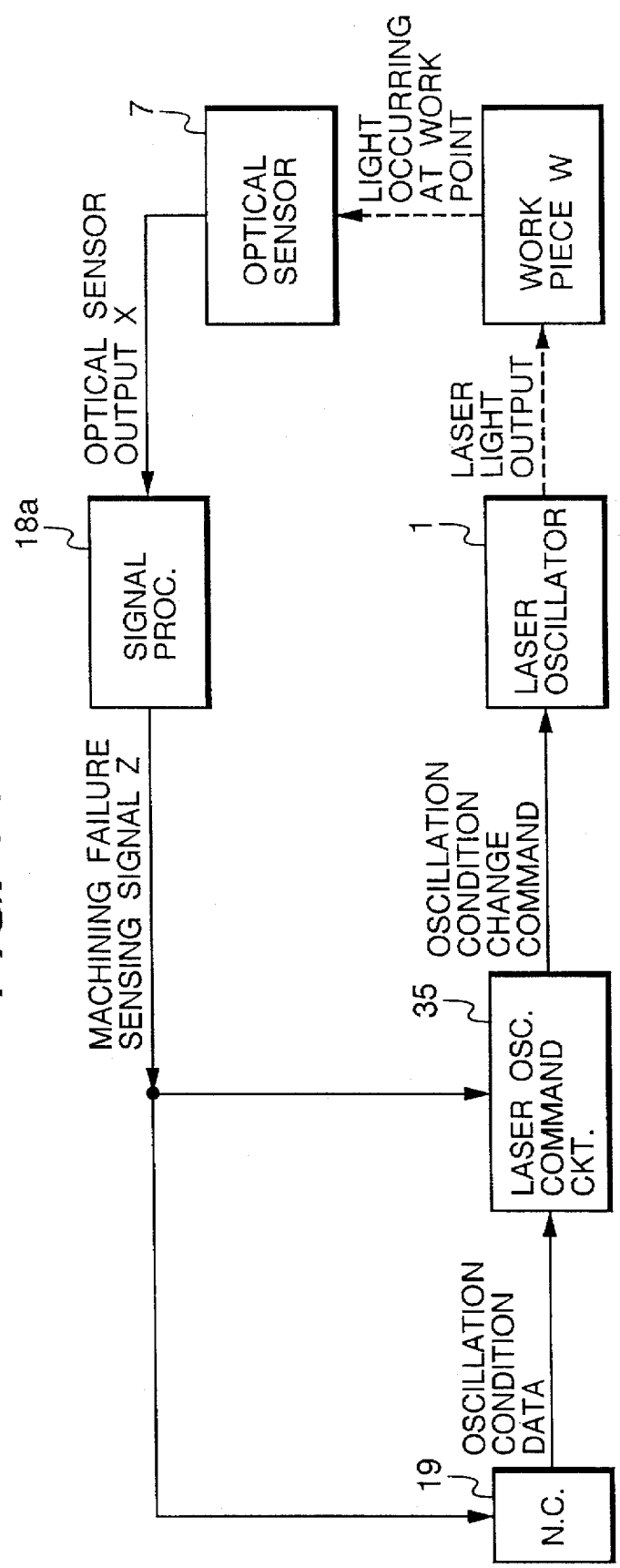
FIG. 14 is a block diagram for controlling a laser oscillator in response to optical sensor output.

An example in which the laser oscillation command circuit 35 controls oscillation conditions of laser output, frequency, duty cycle, etc., based on the machining failure detection signals $Z_1$, $Z_2$, and $Z_3$, will be discussed in detail with reference to FIG. 14.

The machining failure sensing signal Z processed by the optical sensor detection signal processors 18a, namely, failure detection signals $Z_1$, $Z_2$, and $Z_3$ are input directly to the laser oscillation command circuit 35, not via the numerical controller 19. When the machining failure sensing signal Z is input, the laser oscillation command circuit 35 outputs an oscillation condition change command for changing laser output, frequency, duty cycle, etc., to the laser oscillator 1 so as to change the oscillation condition data including laser output, frequency, and duty cycle preset by the NC controller 19 before laser radiation for maintaining optimum laser machining. The laser oscillator 1 is responsive to the oscillation condition change command for generating laser light with laser output, frequency, duty cycle, etc., changed.

Since the machining failure sensing signal Z is not output to the laser oscillation command circuit 35 via the numerical controller 19 for changing the oscillation conditions of the laser oscillator 1, a fast-response feedback control system can be obtained using machining phenomena independent of the processing speed of the numerical controller 19 as feedback information. For example, in piercing, a workpiece can always be radiated with the maximum laser power without reaching blow-up, and high-speed drilling can be performed.

As described above, light 5 generated at a laser radiation point is detected by the optical sensor 7, the optical sensor output X is processed, and the laser machining system is controlled in response to the processing result, thereby enabling piercing completion detection, blow-up detection and prevention, cutting failure detection and improvement, and laser hardening and laser cladding execution and management for automated machining and automated system operation.

Embodiment 7

In a seventh embodiment, an example in which the laser machining state is recognized based on a light emission distribution of light 5 generated at a laser radiation point will be discussed with reference to FIGS. 15 to 17.

Figure 15:
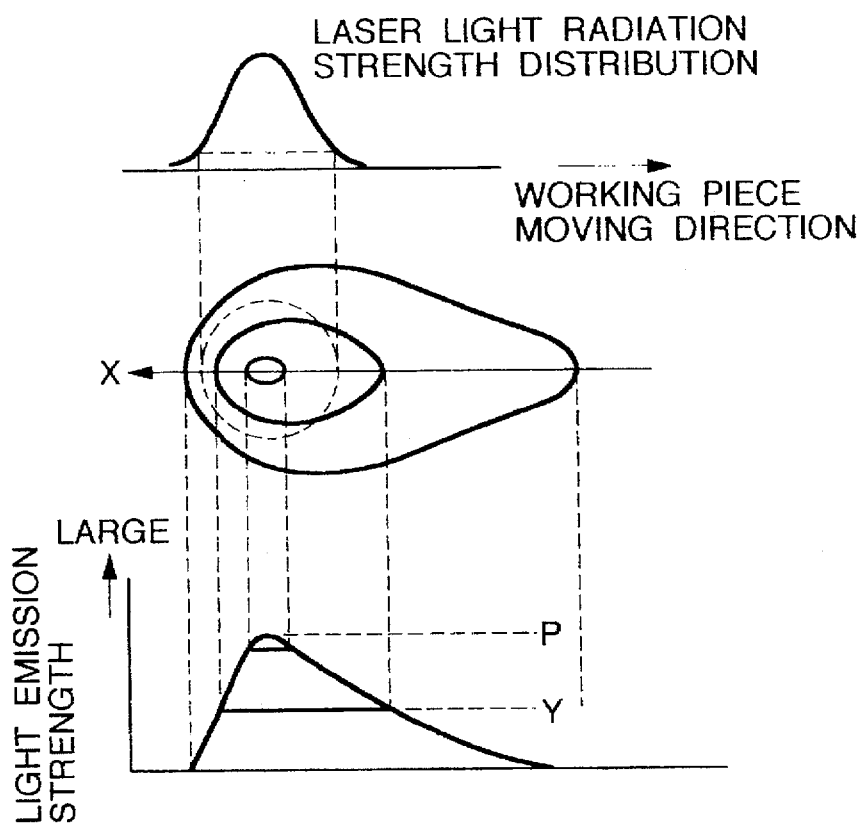
FIG. 15 is a schematic diagram representing a light emission (temperature) distribution of a workpiece during laser radiation in a seventh embodiment of the invention.

FIG. 15 is a schematic diagram showing a light emission intensity (temperature) distribution of thermal radiation from a laser radiation point on a workpiece W when the workpiece W, which being moved in the X direction, is radiated with circularly polarized laser light 2a having an energy distribution such as a Gaussian distribution. An example for recognizing the laser machining state based on a light emission distribution of light generated at a laser radiation point will be discussed, with the schematic diagram representing a light emission intensity distribution provided by using an optical sensor 7 having an image pick-up device sensitive to infrared rays for detecting a temperature change of a laser-light-irradiated part from just above the workpiece W, and an optical sensor detection signal processor 18a for performing image processing.

Figure 16:
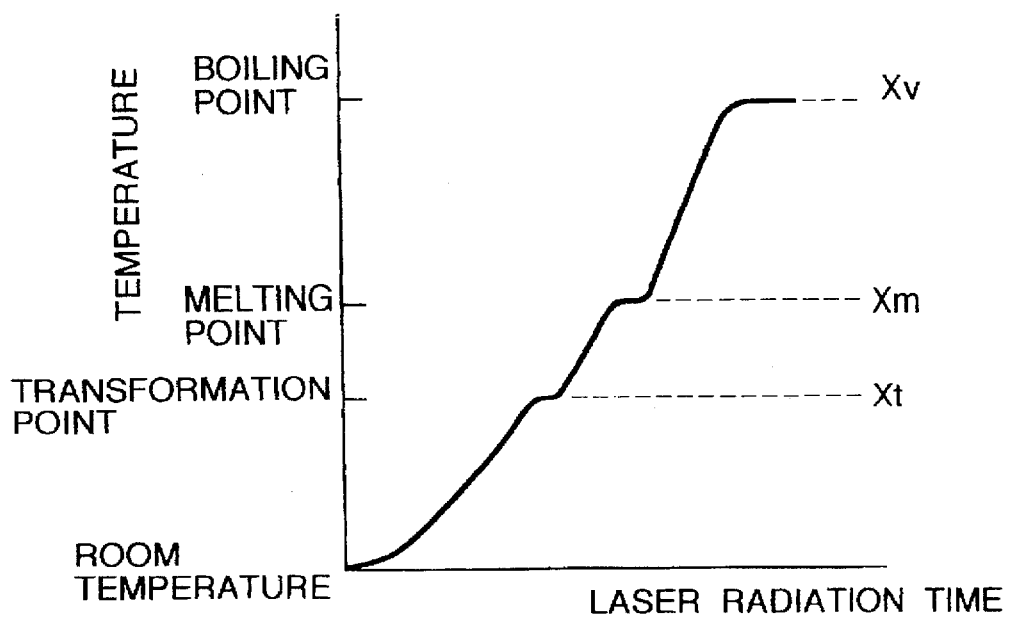
FIG. 16 is a chart representing a temperature change of laser radiation in FIG. 15.

FIG. 16 is a chart representing the light emission intensity at the laser radiation point. Normally, when a still workpiece W is radiated with laser light, the temperature of the laser-light-irradiated part rises with an increase in the laser radiation time as transformation point, melting point, and boiling point, and at the same time the light emission intensity increase. Thus, the optical sensor output X level detected by the optical sensor 7 also increases.

Figure 17:
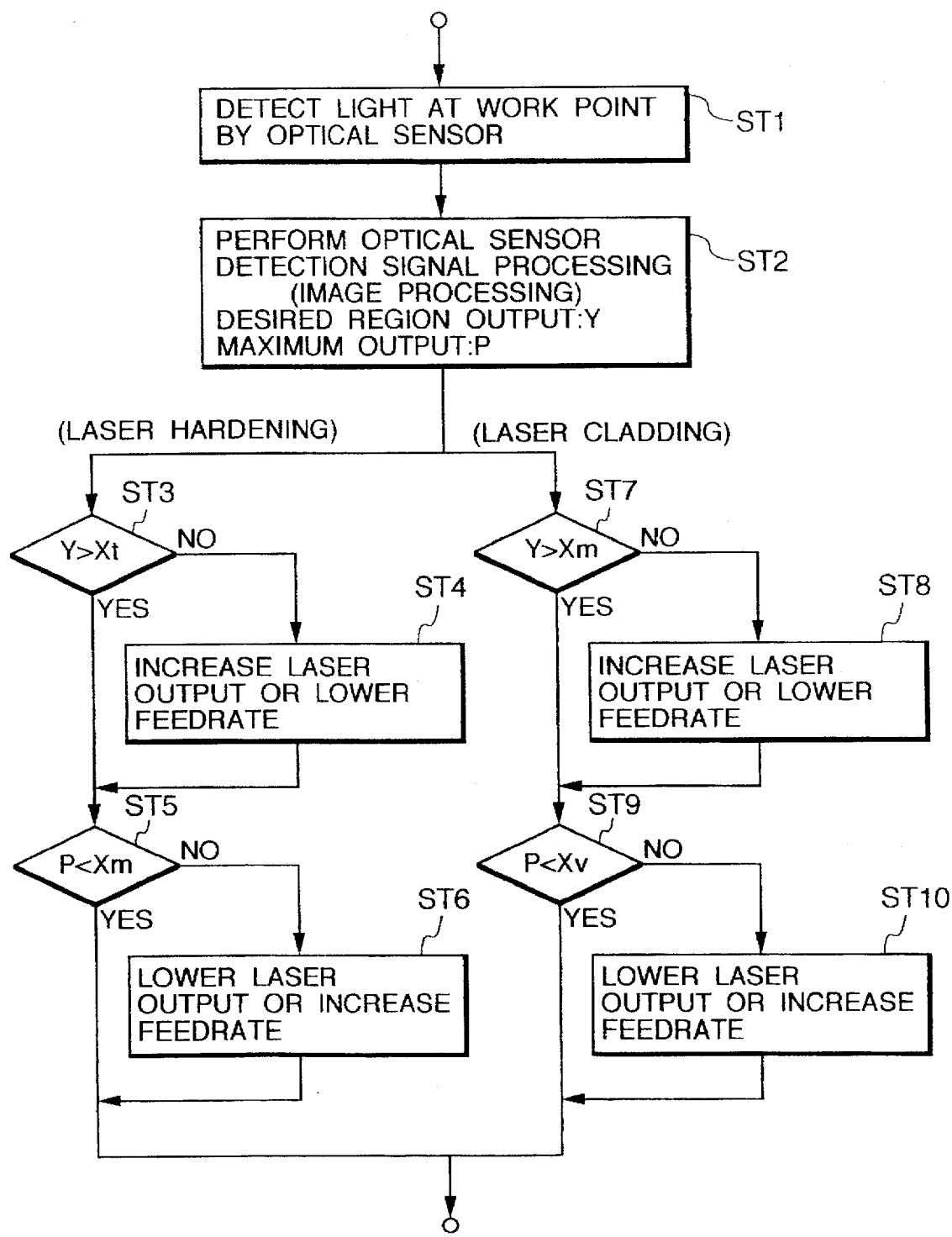
FIG. 17 is a flowchart showing a procedure for laser machining system in laser heat treatment.

FIG. 17 is a flowchart showing a procedure of a laser machining system used in laser heat treatment (laser hardening, laser cladding). Recognition of the laser machining state based on the light emission distribution of light 5 generated at a laser radiation point on a workpiece W in an optical sensor detection signal processor 18a will be described in detail.

The laser machining system of this embodiment keeps track of the reference level at the transformation point (light emission intensity), $X_p$ reference level at the melting point (light emission intensity), $X_m$, and reference level at the boiling point (light emission intensity), $X_p$, of optical sensor output X previously found, and performs control so that output in a desired region Y and the maximum output P in the desired region Y based on an optical sensor output X detected during laser machining lie within the desired ranges of the reference levels $X_p$, $X_m$, and $X_p$.

First, laser hardening control will be discussed with reference to FIG. 17. Light at the laser radiation point detected by the optical sensor 7 at step ST1 is input to the optical sensor detection signal processor 18a, which then performs image processing of the light based on optical sensor output X at step ST2 for providing desired region output Y and the maximum output P in the desired region output Y shown in FIG. 15.

At step ST3, the optical sensor detection signal processor 18a compares the desired region output Y with the predetermined reference level $X_t$ at the transformation point. If the desired region output Y level is lower than the predetermined reference level $X_t$, the transformation point is not reached at the work point and control goes to step ST4 at which, for example, the laser output is increased or the feedrate of the workpiece W is lowered. In contrast, if the desired region output Y level is higher than the reference level $X_t$ at the transformation point, control goes to step ST5.

At step ST5, the maximum output P of the desired region output Y is compared with the predetermined reference level $X_m$ at the melting point. If the maximum output P level of the desired region output Y is higher than the predetermined reference level $X_m$, the melting point is reached in a part of the work point and control goes to step ST6 at which, for example, laser output is lowered and the feedrate of the workpiece W is increased. In contrast, if the optical sensor output X level is less than the reference level $X_t$ at the transformation point, it is determined that the current work point state is optimal (the machining range is more than the transformation point and the maximum output in the machining range does not exceed the melting point). Laser machining is continued as required.

Thus, if the laser output or the feedrate is adjusted so that the desired region output Y detected during laser machining exceeds the reference level $X_t$ at the transformation point in the desired region and so that the maximum output P of the desired region output Y does not exceed the reference level $X_m$ at the transformation point in the desired region, laser hardening can be performed in the desired range without producing a molten layer.

Next, laser cladding control will be discussed with reference to FIG. 17. The laser cladding control is the same as the laser hardening control in steps ST1 and ST2, which will not be discussed again. Steps ST7 and later will be discussed.

At step ST7, the optical sensor detection signal processor 18a compares the desired region output Y with the predetermined reference level $X_m$ at the melting point. If the desired region output Y level is lower than the predetermined reference level $X_m$, the work point does not reach the melting point and laser cladding cannot be performed. Then, control goes to step ST8 at which, for example, laser output is increased or the feedrate of the workpiece W is lowered. In contrast, if the desired region output Y level is higher than the reference level $X_m$ at the melting point, control goes to step ST9.

At step ST9, the maximum output P of the desired region output Y is compared with the predetermined reference level $X_p$ at the boiling point. If the maximum output P level of the desired region output Y is higher than the predetermined reference level $X_p$, a part of the work point reaches the boiling point and control goes to step ST10 at which, for example, the laser output is lowered and the feedrate of the workpiece W is increased. In contrast, if the maximum output P level of the desired region output Y is lower than the reference level $X_p$ at the boiling point, laser machining is continued as required.

Thus, if the laser output or the feedrate is adjusted so that the desired region output Y detected during laser machining exceeds the reference level $X_m$ at the melting point in the desired region and so that the maximum output P of the desired region output Y does not exceed the reference level $X_p$ at the boiling point, laser cladding can be performed in the desired range without producing a defective layer due to boiling.

In laser welding, similar machining can be performed by observing the laser radiation point (work point) through an optical filter which removes plasma light emission.

Thus, light 5 generated at a laser radiation point is detected by the optical sensor 7, the optical sensor output X is processed, and the laser machining system is controlled in response to the processing result, thereby enabling laser hardening and laser cladding execution and management for automated machining and automated system operation.

Embodiment 8

Figure 18:
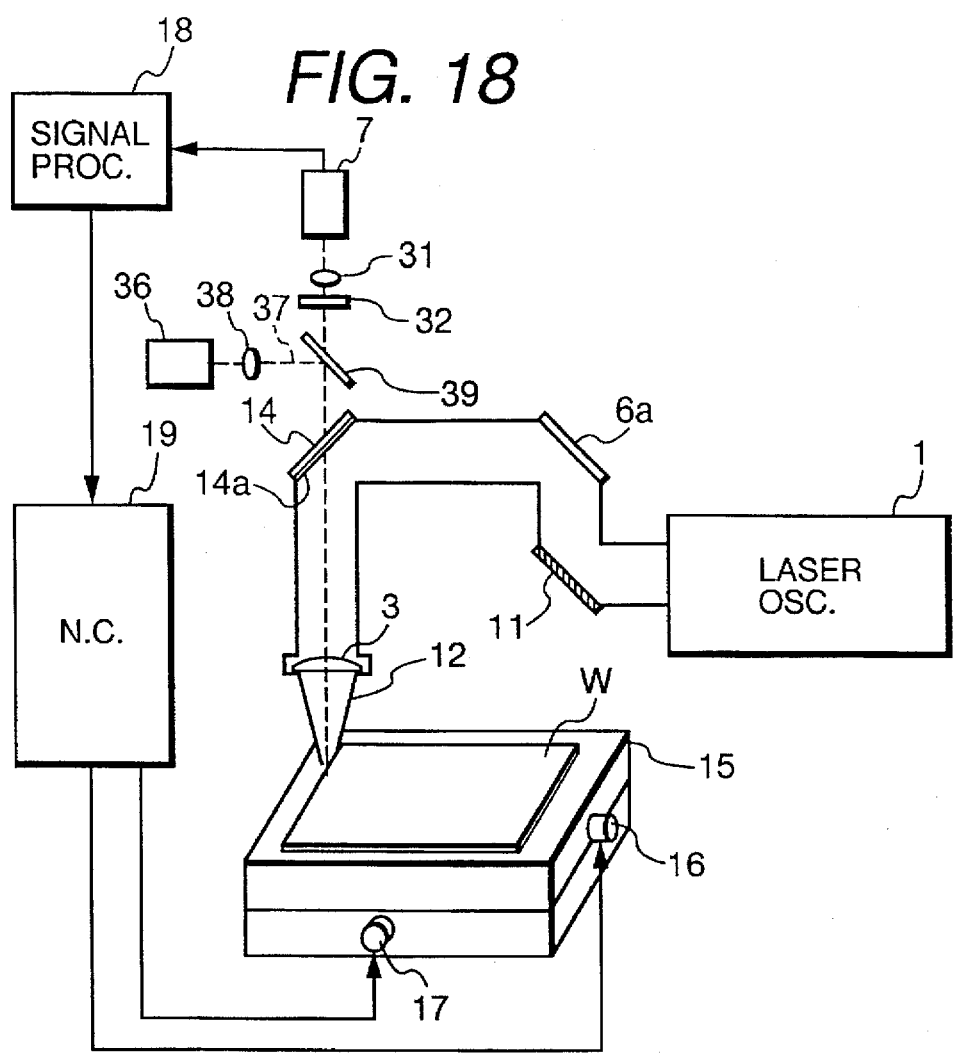
FIG. 18 is a block diagram showing the configuration of a laser machining system according to an eighth embodiment of the invention.

FIG. 18 is a block diagram showing the configuration of a laser machining system according to an eighth embodiment of the invention. Components identical with or similar to those previously described with reference to the preceding figures are denoted by the same reference numerals in FIG. 18 and will not be discussed again. Reference numeral 36 is a lighting device, namely, lighting means for generating illuminating light 37, reference numeral 38 is a lighting lens for collecting the illuminating light 37 generated from the lighting device 36, and reference numeral 39 is a beam splitter, which is a partial reflection mirror (half-silvered mirror) having, for example, a 50% transmission factor for introducing the illuminating light 37 converted into parallel light through the lighting lens 38 into an optical transmission line coaxial with laser light.

Next, position detection of a workpiece W, which is a featuring operation of this embodiment, will be discussed. The illuminating light 37 generated from the lighting device 36 is converted into parallel light through the lighting lens 38 and the beam splitter 39 is radiated with the parallel light. The beam splitter 39, which is a partial reflection mirror having, for example, a 50% transmission factor, transmits one half of the illuminating light 37 generated by the lighting device 36 and introduces the other half into the optical transmission line. The illuminating light 37 introduced into the optical transmission line is collected by a machining lens 3 for illuminating the work surface of a workpiece W coaxially with laser light.

By illuminating the work surface of the workpiece W, the illuminating light 37 reflected from the surface of the workpiece W passes through a phase difference control mirror 14 at nearly a 100% transmission rate and is detected by an optical sensor 7 as 50% reflected illuminating light 37 through the beam splitter 39 having a 50% transmission factor. The optical sensor 7 sends the optical sensor output X to an optical sensor detection signal processor 18 based on the light emission intensity of the illuminating light 37 as in the embodiments described above. For example, when the reflected illuminating light 37 does not reach a given level, the optical sensor detection signal processor 18 determines that the workpiece W does not exist at the same position as the laser radiation point. The workpiece W, or the machining head 12, is moved while the illuminating light 37 is detected by the optical sensor 7. If the outside of the workpiece W is illuminated as described above, the detection level of the reflected illuminating light 37 does not reach a given level, and thus one end of the workpiece W can be detected. The absolute position on a machining table 14 can be detected from the coordinates in a numerical controller 19 at this time.

Figure 19:
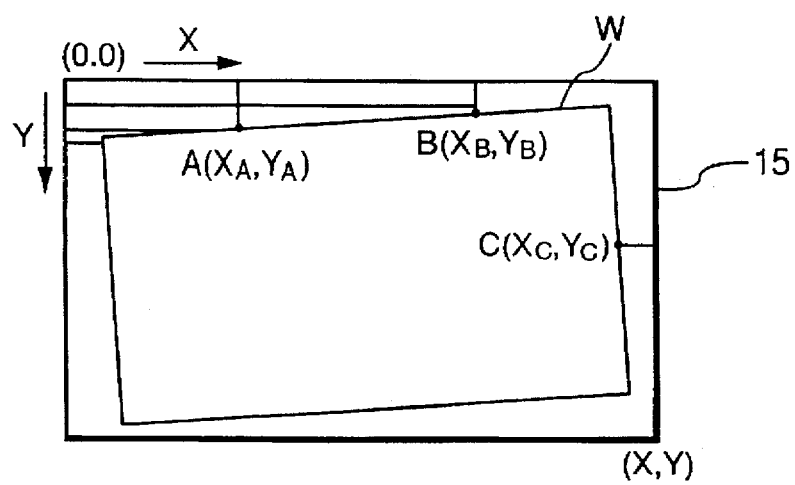
FIG. 19 is an illustration showing a position detection method of a workpiece in the eighth embodiment.

As shown in FIG. 19, for example, when the workpiece W is a rectangular material of a typical size used in manufacturing, if the coordinates of at least three points A, B, and C are detected as described above, the orientation of the workpiece W on the machining table 15 can be obtained. If rotation or offset processing is performed for the coordinates in the NC machining program in the numerical controller 19 in response to the placement condition, the workpiece W can be machined although it is placed unexactingly on the machining table 15.

The detection may be made according to marks provided on the workpiece, such as round holes, instead of end detection. Further, the position detection can also be executed using light detected when the workpiece W is actually radiated with laser light, in addition to the reflected light detection by the lighting means as described above, needless to say.

Embodiment 9

Figure 20:
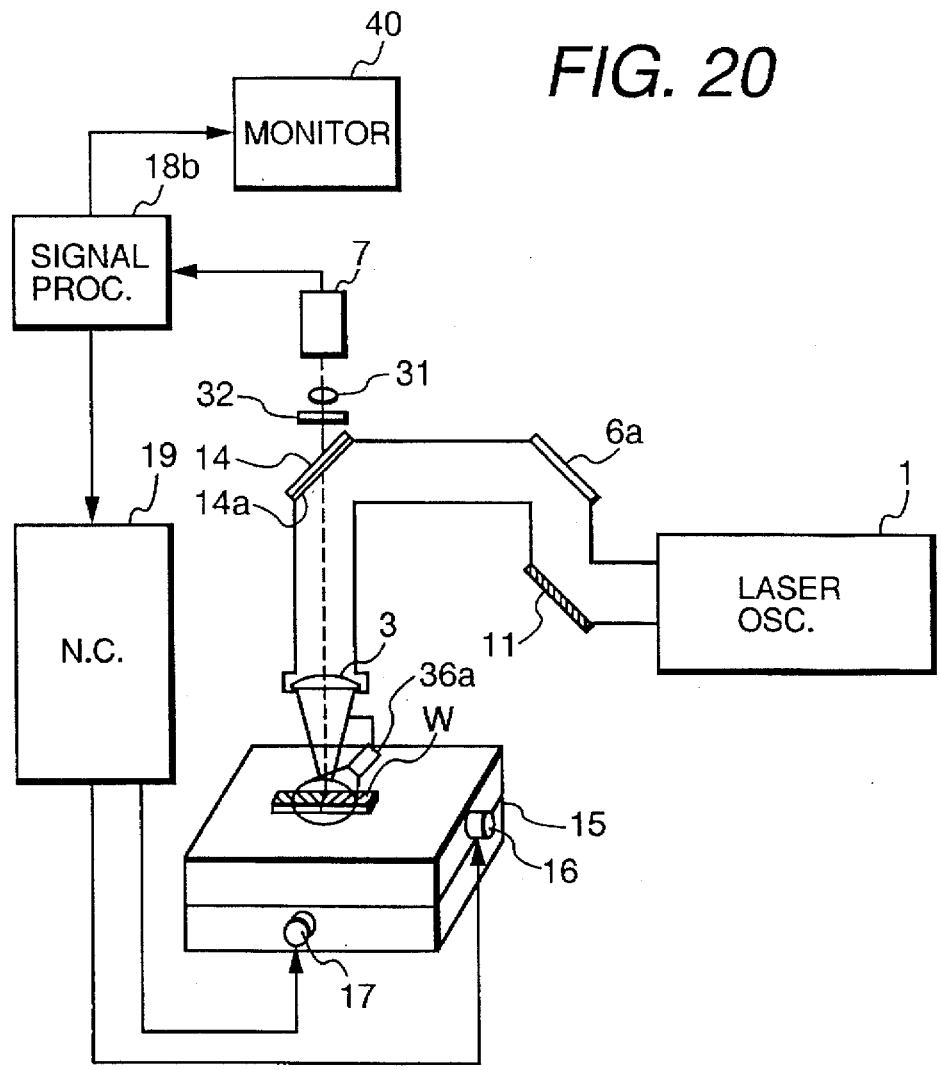
FIG. 20 is a block diagram showing the configuration of a laser machining system according to a ninth embodiment of the invention.

FIG. 20 is a block diagram showing the configuration of a laser machining system according to a ninth embodiment of the invention. Components identical with or similar to those previously described with reference to the preceding figures are denoted by the same reference numerals in FIG. 20 and will not be discussed again. Reference numeral 18*b* is an optical sensor detection signal processor for performing image processing for the optical sensor output X from an optical sensor 7 using an image pick-up device and displaying an image on a monitor screen 40. Reference numeral 36*a* is a lighting device located near a machining head 12 for emitting illuminating light 37 (visible light).

Figure 21:
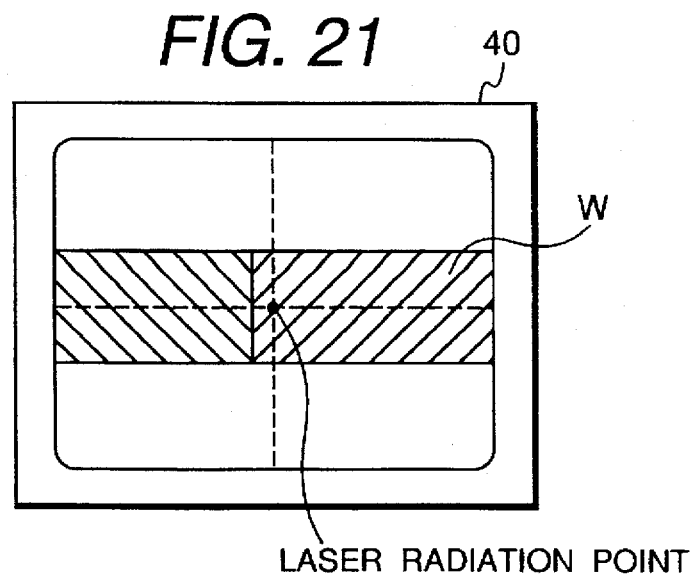
FIG. 21 is a schematic drawing showing a monitor screen in the ninth embodiment.

FIG. 21 is a schematic drawing showing the display on the monitor screen 40, wherein the point matching a laser radiation position is marked.

The image of a workpiece W radiated with the visible illuminating light 37 is picked up by the optical sensor 7 of an image pick-up device, image processing is performed by the optical sensor detection signal processor 18*b*, and then the resultant image is displayed on the monitor screen 40. The worker sees the monitor screen and determines the laser radiation position by moving a machining table 15 or the machining head 12 so that the mark on the monitor screen 40 matches the position of the workpiece W to be radiated with laser light.

Alternatively, similar to the operation described with respect to the eighth embodiment, the optical sensor detection signal processor 18*b* automatically detects the position of a mark (not shown) made at the laser radiation point on the workpiece W surface and automatically moves the machining table 15 or the machining head 12 for positioning so that the laser radiation point is moved to the mark position on the workpiece W surface.

Thus, in the ninth embodiment, the laser radiation position can be determined accurately for the workpiece W. This feature is useful for laser spot welding, etc. The illumination means also may be provided in an optical transmission line as in the eighth embodiment.

Embodiment 10

Figure 22:
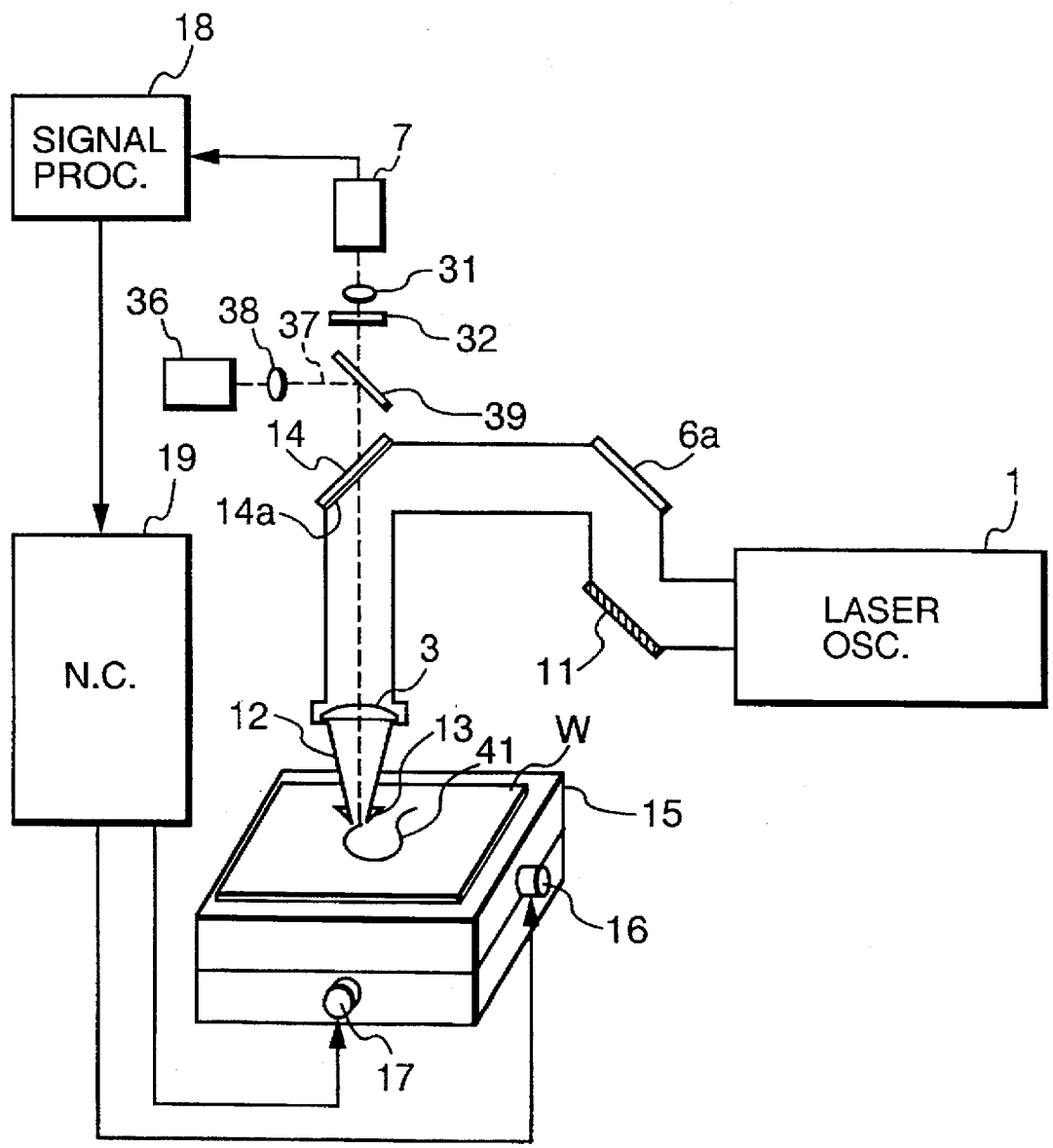
FIG. 22 is a block diagram showing the configuration of a laser machining system according to a tenth embodiment of the invention.
Figure 23:
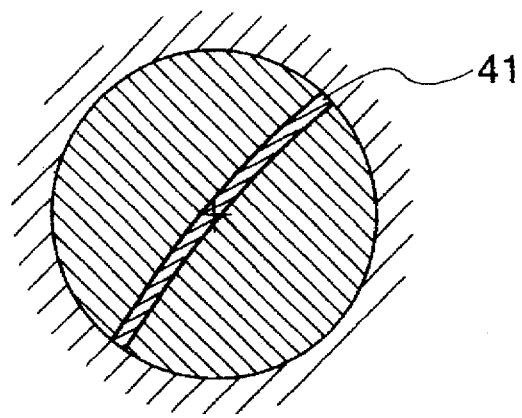
FIG. 23 is a schematic drawing showing the detection state of a workpiece during machining path marked-off line detection operation in a tenth embodiment.
Figure 24:
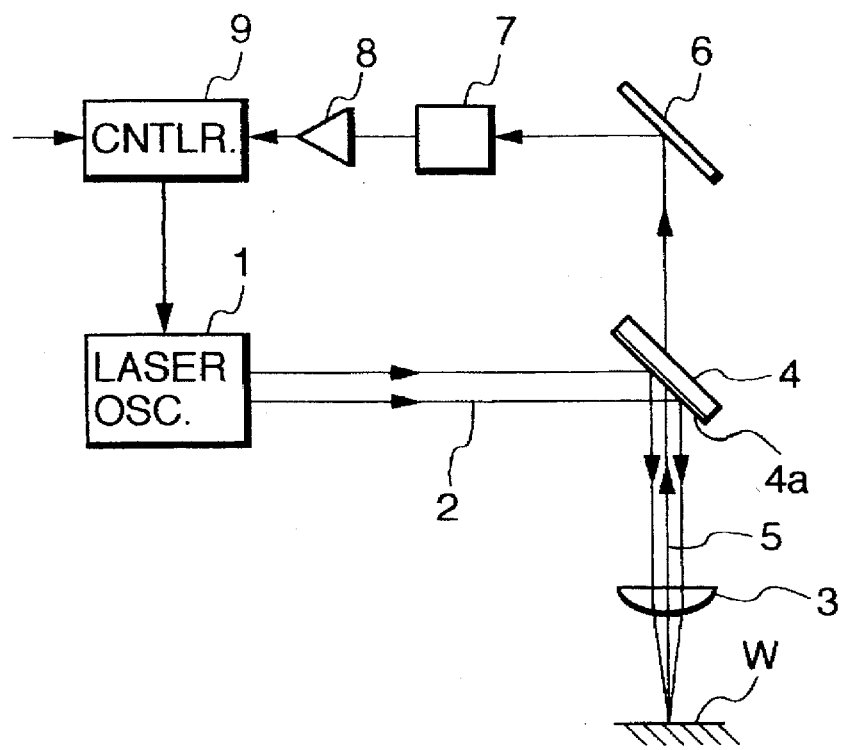
FIG. 24 is block diagram showing the configuration of a conventional laser machining system.

FIG. 22 is a block diagram showing the configuration of a laser machining system according to a tenth embodiment of the invention. FIG. 23 is a conceptual drawing showing the state of the work surface of a workpiece W detected by an optical sensor 7, for example.

In the tenth embodiment, similar to the eighth and ninth embodiments, the work surface of a workpiece W illuminated by illuminating light 37 of a lighting device 36 is detected by the optical sensor 7 using an image pick-up device, and image processing is performed for the optical sensor output X of the optical sensor 7 by an optical sensor detection signal processor 18, whereby a machining path marked-off line 41, corresponding to the desired machining path and which was previously marked on the surface of the workpiece W, can be detected.

A numerical controller 19 transmits a drive command to a machining table 15 so that the center of a nozzle 13 of a machining head 12 is moved to the machining path marked-off line 41 (see FIG. 22) to perform an automatic copying operation along the machining path marked-off line 41. Thus, form machining is enabled without inputting a machining program in which the machining path is previously written to the numerical controller 19. For laser welding, the machining path marked-off line 41 corresponds to a welding line and welding line copying is enabled.

Detection of a copying operation of the machining path marked-off line 41 marked on the surface of the workpiece W may be performed while the workpiece W is actually radiated with laser light for laser machining. Machining path teaching may be performed using only the copying operation before laser machining is performed based on the teaching data.

Further, if the machining table 15 is a three-dimensional machining table, including the machining head 12 which can both rotate and move along horizontal axes, the copying operation of a machining path marked-off line 41 previously marked on a three-dimensional object is enabled so that teaching formerly performed manually can be automated, and thus the overall work time can be drastically shortened. The lighting means used at the time may be provided in an optical transmission path as in the eighth embodiment, or near the machining head as in the ninth embodiment.

The invention produces the following effects:

The laser machining system of the invention comprises laser oscillator means for producing laser light for machining a workpiece, a circular polarization mirror for converting laser light output from the laser oscillator means into circularly polarized laser light, optical means for collecting the circularly polarized laser light into which the laser light is converted by the circular polarization mirror and radiating the workpiece therewith, a phase difference control mirror placed between the optical means and the circular polarization mirror for reflecting the circularly polarized laser light to the optical means while a phase difference between both S and P polarization components is maintained while transmitting light produced at a work point on the workpiece due to radiation of the workpiece with the circularly polarized laser light, photodetecting means for detecting the light transmitted through the phase difference control mirror and generating a light detection signal, laser machining recognition means for recognizing a laser machining state based on the light detection signal from the photodetecting means and outputting a laser machining state recognition signal, and control means for controlling laser machining for the workpiece based on the laser machining state recognition signal output by the laser machining recognition means. Thus, the inventive laser machining system reflects circularly polarized laser light with the phase difference between both S and P polarization components maintained, does not degrade the laser light quality or polarization state, and does not impair the machining characteristics of the circularly polarized laser light.

Since the amplification factor of the light detection signal output by the photodetecting means is changed in response to the optical path length between the workpiece and the photodetecting means, the output level of the light detection signal input to the laser machining recognition means is constant, enabling stable laser machining state recognition.

Further, with the phase difference control mirror located at the position nearest the work point so as to make the optical path length between the photodetecting means and the workpiece constant, the light reception amount from the workpiece input to the photodetecting means is made constant, enabling stable laser machining state recognition.

The laser machining system of the invention comprises laser oscillator means for producing laser light for machining a workpiece, optical means for collecting the laser light produced by the laser oscillator means and radiating the workpiece with the collected light, photodetecting means for detecting light produced at a work point on the workpiece due to radiation of the workpiece by the laser light and outputting a light detection signal, laser machining recognition means comprising an amplification section for amplifying an oscillation amplitude voltage in a sampling period in the light detection signal output from the photodetecting means, the laser machining recognition means for comparing the amplified oscillation amplitude voltage in the sampling period with a predetermined reference voltage for recognizing a laser machining state and outputting a laser machining state recognition signal, and control means for controlling laser machining for the workpiece based on the laser machining state recognition signal. Thus, the oscillation amplitude of the oscillation amplitude voltage in the sampling period in the light detection signal from the photodetecting means is enhanced, making a distinct difference from the reference voltage, facilitating sensing the laser machining state, and improving the detection accuracy.

Further, the laser machining system of the invention may comprise laser oscillator means for producing laser light for machining a workpiece, optical means for collecting the laser light produced by the laser oscillator means and radiating the workpiece with the collected light, photodetecting means for detecting light produced at a work point on the workpiece due to radiation of the workpiece by the laser light and outputting a light detection signal, laser machining recognition means comprising a filter section for extracting only a frequency component required for recognizing a laser machining state from the light detection signal output from the photodetecting means, the laser machining recognition means for comparing the voltage of the frequency component provided through the filter section with a predetermined reference voltage for recognizing a laser machining state and outputting a laser machining state recognition signal, and control means for controlling laser machining for the workpiece based on the laser machining state recognition signal. Thus, the filter section can extract only the frequency component required for recognizing the laser machining state from the light detection signal, so that frequencies having components causing erroneous recognition or not used for recognition with the reference voltage can be cut, improving the recognition accuracy of the laser machining state.

The filter section extracts a low-frequency component using a cutoff frequency of several tens of Hz to several hundred Hz for extracting only a predetermined frequency component and compares it with the reference voltage for sensing a blow-up phenomenon. Thus, the blow-up phenomenon can be quickly detected without erroneous recognition.

Further, the filter section extracts a low-frequency component using a cutoff frequency having a frequency component of less than several tens of Hz for extracting only a predetermined frequency component and compares it with the reference voltage for sensing a burning phenomenon. Thus, the burning phenomenon can be securely detected without erroneous recognition.

Since the reference voltage used for comparison is changed in response to the material of the workpiece or the output of the laser oscillator, the laser machining state can be reliably recognized in response to the material of the workpiece or the output of the laser oscillator means.

The laser machining system comprising laser oscillator means for producing laser light for machining a workpiece, optical means for collecting the laser light produced by the laser oscillator means and radiating the workpiece with the collected light, photodetecting means for detecting a light emission distribution of light produced at a work point on the workpiece due to radiation of the workpiece by the laser light and outputting a light detection signal, laser machining recognition means for recognizing a laser machining state based on the form of the light emission distribution of light generated at the work point on the workpiece in the light detection signal and outputting a laser machining state recognition signal, and control means for controlling laser machining for the workpiece based on the laser machining state recognition signal. Thus, the state at the work point on the workpiece radiated with laser light can be accurately recognized based on the light emission distribution and laser machining control to detail dan be performed.

The laser machining system further includes laser oscillation command means for controlling laser oscillation conditions, such as the laser oscillator means output peak value, frequency, duty cycle, etc., based on the laser machining state recognition signal from the laser machining recognition means, and control is performed only by the laser oscillation command means, so that the laser oscillator can be directly controlled based on the laser machining state recognition signal. Thus, the result of the detected laser machining state can be quickly fed back to the laser oscillator for controlling the laser machining system, thus providing fast response.

The means for radiating the workpiece is provided apart from the laser oscillator means for machining the workpiece, and the end position of the workpiece is detected from light intensity reflecting radiation light of the radiation means, so that position presetting of the workpiece for laser machining becomes unnecessary, improving workability.

Further, the laser machining recognition means detects the position of the workpiece based on at least three positions where the reflected light intensity changes. Thus, the workpiece position can be detected more reliably.

The laser machining recognition means detects a machining path line marked on a workpiece, the line differing from the workpiece in reflection factor based on light reflected from the workpiece, and the control means performs laser machining based on machining path information from the laser machining recognition means. Thus, a machining program need not be previously input for laser machining, and copy machining can be automatically performed along the detected machining path.

What is claimed is:

1. A laser machining system comprising:

laser oscillator means for producing laser light for machining a workpiece;

a circular polarization mirror for converting laser light output from said laser oscillator means into circularly polarized laser light;

optical means for collecting the circularly polarized laser light into which the laser light is converted by said circular polarization mirror and radiating the workpiece therewith;

a phase difference control mirror placed between said optical means and said circular polarization mirror for reflecting the circularly polarized laser light to said optical means while a phase difference between both S and P polarization components is maintained and transmitting light produced at a work point on the workpiece due to radiation of the workpiece with the circularly polarized laser light;

photodetecting means for detecting the light transmitted through said phase difference control mirror and generating a light detection signal;

laser machining recognition means for recognizing a laser machining state based on the light detection signal from said photodetecting means and outputting a laser machining state recognition signal; and control means for controlling laser machining for the workpiece based on the laser machining state recognition signal output by said laser machining recognition means.

2. The laser machining system as claimed in claim 1, further comprising amplification means for changing an amplification factor of the light detection signal output by said photodetecting means in response to an optical path length between the workpiece and said photodetecting means for making an output level of the light detection signal constant when the signal is output to said laser machining recognition means.

3. The laser machining system as claimed in claim 1, wherein said phase difference control mirror is located at a position nearest to a work point so as to maintain an optical path distance between said photodetecting means and the workpiece constant.

4. The laser machining system as claimed in claim 1, further comprising means for radiating a workpiece apart from said laser oscillator means for machining a workpiece, wherein said laser machining recognition means detects an end position of the workpiece from light intensity reflecting radiation light of said radiation means.

5. The laser machining system as claimed in claim 1 or 4, wherein said laser machining recognition means detects the position of the workpiece based on at least three positions where reflected light intensity changes.

6. The laser machining system as claimed in claim 1 or 4, wherein said laser machining recognition means detects a machining path line marked on a workpiece, said machining path line having a different reflection factor from the workpiece, based on light reflected from the workpiece, and wherein said control means performs laser machining based on machining path information from said laser machining recognition means.

7. A laser machining system comprising:

laser oscillator means for producing laser light for machining a workpiece;

optical means for collecting the laser light produced by said laser oscillator means and radiating the workpiece with the collected light;

photodetecting means for detecting light produced at a work point on the workpiece due to radiation of the workpiece by the laser light and outputting a light detection signal;

laser machining recognition means comprising an amplification section for amplifying an oscillation amplitude voltage in a sampling period in the light detection signal output from said photodetecting means, said laser machining recognition means comparing the amplified oscillation amplitude voltage in the sampling period with a predetermined reference voltage for recognizing a laser machining state and outputting a laser machining state recognition signal; and control means for controlling laser machining for the workpiece in response to the laser machining state recognition signal.

8. The laser machining system as claimed in claim 7, further comprising means for changing the reference voltage used for comparison in response to at least one of the material of the workpiece and the output of said laser oscillator.

9. The laser machining system as claimed in any one of claims 1, 2, 3, 7, or 8, further comprising laser oscillation command means for controlling laser oscillation conditions of said laser oscillator means, including at least one of output peak value, frequency, and duty cycle, based on the laser machining state recognition signal from said laser machining recognition means, wherein control of said laser oscillation conditions of said laser oscillator means is performed only by said laser oscillation command means.

10. A laser machining system comprising:

laser oscillator means for producing laser light for machining a workpiece;

optical means for collecting the laser light produced by said laser oscillator means and radiating the workpiece with the collected light;

photodetecting means for detecting light produced at a work point on the workpiece due to radiation of the workpiece by the laser light and outputting a light detection signal;

laser machining recognition means comprising a filter section for extracting only a frequency component required for recognizing a laser machining state from the light detection signal output from said photodetecting means, said laser machining recognition means comparing the voltage of the frequency component provided through said filter section with a predetermined reference voltage for recognizing a laser machining state and outputting a laser machining state recognition signal;

control means for controlling laser machining for the workpiece based on the laser machining state recognition signal; and laser oscillation command means for controlling laser oscillation conditions of said laser oscillator means, including at least one of output peak value, frequency, and duty cycle, based on the laser machining state recognition signal;

wherein control of said laser oscillation conditions of said laser oscillator means is performed only by said laser oscillation command means.

11. The laser machining system as claimed in claim 10, wherein said frequency component required for recognizing a laser machining state is compared with a predetermined reference voltage for sensing a blow-up phenomenon.

12. The laser machining system as claimed in claim 10, wherein said frequency component required for recognizing a laser machining state is compared with a predetermined reference voltage for sensing a burning phenomenon.

13. A laser machining system comprising:

laser oscillator means for producing laser light for machining a workpiece;

optical means for collecting the laser light produced by said laser oscillator means and radiating the workpiece with the collected light;

photodetecting means for detecting a light emission distribution of light produced at a work point on the workpiece due to radiation of the workpiece by the laser light and outputting a light detection signal;

laser machining recognition means for recognizing a laser machining state based on the form of the light emission distribution of light generated at the work point on the workpiece in the light detection signal and outputting a laser machining state recognition signal;

control means for controlling laser machining for the workpiece based on the laser machining state recognition signal; and laser oscillation command means for controlling laser oscillation conditions of said laser oscillator means, including at least one of output peak value, frequency, and duty cycle, based on the laser machining state recognition signal;

wherein control of said laser oscillation conditions of said laser oscillator means is performed only by said laser oscillation command means.

* * * * *